US012583539B2

(12) United States Patent
Grenzi et al.

(10) Patent No.: US 12,583,539 B2
(45) Date of Patent: Mar. 24, 2026

(54) CRAWLER TRACK, SHOE, TRACK LINK, UNDERCARRIAGE ASSEMBLY AND VEHICLE PROVIDED WITH A POWER SUPPLY UNIT FOR POWERING SENSORS

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT); Raffaele De Scisciolo, Ferrara (IT)

(73) Assignees: Berco S.p.A., Copparo/Ferrara (IT); thyssenkrupp AG, Essen (DE)

( * ) Notice: Subject to any disclaimer, the term of this patent is extended or adjusted under 35 U.S.C. 154(b) by 1073 days.

(21) Appl. No.: 17/602,964

(22) PCT Filed: Apr. 9, 2020

(86) PCT No.: PCT/EP2020/060243

§ 371 (c)(1),
(2) Date: Oct. 11, 2021

(87) PCT Pub. No.: WO2020/208179

PCT Pub. Date: Oct. 15, 2020

(65) Prior Publication Data

US 2022/0185399 A1 Jun. 16, 2022

(30) Foreign Application Priority Data

Apr. 12, 2019 (EP) ..................................... 19425029

(51) Int. Cl.
*B62D 55/28* (2006.01)
*B62D 55/21* (2006.01)
(52) U.S. Cl.
CPC ............. *B62D 55/28* (2013.01); *B62D 55/21* (2013.01)

(58) Field of Classification Search
CPC ................................. B62D 55/21; B62D 55/28
See application file for complete search history.

(56) References Cited

U.S. PATENT DOCUMENTS 3,434,678 A * 3/1969 Brown ................... H02M 11/00
191/1 R
7,307,589 B1 * 12/2007 Gregoire ................ H01Q 1/248
343/700 MS (Continued)

FOREIGN PATENT DOCUMENTS

CN 105584546 A 5/2016
CN 107323548 A 11/2017

(Continued)

OTHER PUBLICATIONS

English Translation of International Search Report Issued in PCT/EP2020/060243 dated Jun. 30, 2020.

*Primary Examiner* — Kip T Kotter

(74) *Attorney, Agent, or Firm* — thyssenkrupp North America, LLC

(57) ABSTRACT

A heavy-duty vehicle may include a crawler track on which a rest of the vehicle can roll so as to move. A sensor may be configured to detect a physical quantity of the crawler track, of the heavy-duty vehicle, or of the environment contained by or surrounding the crawler track or the heavy-duty vehicle. A power supply unit may be configured to supply the sensor with electric power. The power supply unit comprises a rectenna configured to receive electromagnetic power from an external electromagnetic source and to supply the sensor with at least part of the electromagnetic power.

19 Claims, 18 Drawing Sheets

(56) References Cited

U.S. PATENT DOCUMENTS

| | | | |
|---|---|---|---|
| 9,592,866 B2 | 3/2017 | Hasselbusch et al. | |
| 2013/0255354 A1 | 10/2013 | Hawkins et al. | |
| 2014/0324301 A1 | 10/2014 | Rebinsky | |
| 2015/0066291 A1 | 3/2015 | Johannsen et al. | |
| 2015/0081166 A1 | 3/2015 | Diekevers et al. | |
| 2016/0129954 A1* | 5/2016 | Hasselbusch | G01M 17/03 305/15 |
| 2016/0131544 A1* | 5/2016 | Rust | G01M 13/023 73/8 |
| 2016/0178483 A1 | 6/2016 | Sidles | |
| 2016/0221618 A1* | 8/2016 | Sidles | B62D 55/21 |
| 2017/0261450 A1 | 9/2017 | Baarman et al. | |
| 2018/0190045 A1* | 7/2018 | Richard | B62D 55/26 |
| 2018/0265145 A1 | 9/2018 | Todd et al. | |
| 2021/0173399 A1* | 6/2021 | Richard | B60W 50/14 |

FOREIGN PATENT DOCUMENTS

| | | | | |
|---|---|---|---|---|
| WO | WO-9904460 A1 * | 1/1999 | | H01R 39/58 |
| WO | WO-2016099796 A1 * | 6/2016 | | B62D 55/08 |
| WO | 2017/000068 A1 | 1/2017 | | |
| WO | WO-2019097556 A1 * | 5/2019 | | |

* cited by examiner

1

CRAWLER TRACK, SHOE, TRACK LINK, UNDERCARRIAGE ASSEMBLY AND VEHICLE PROVIDED WITH A POWER SUPPLY UNIT FOR POWERING SENSORS

CROSS REFERENCE TO RELATED APPLICATIONS

This application is a U.S. National Stage Entry of International Patent Application Serial Number PCT/EP2020/060243, filed Apr. 9, 2020, which claims priority to European Patent Application No. EP 19425029.6, filed Apr. 12, 2019, the entire contents of both of which are incorporated herein by reference.

FIELD

The present disclosure generally relates to undercarriages and to crawler tracks, including sensors for the crawler tracks, systems for powering sensors on the crawler tracks, and shoes and links for crawler tracks.

BACKGROUND

The hourly costs relating the undercarriage system of heavy duty track vehicles such as bulldozers, excavators or mobile drills are usually very high and very frequently cover the most part of the maintenance costs of the whole vehicle.

For this reason it is desired to monitor the temperature, wear and load conditions of some parts.

The undercarriage parts are subject for example to severe mechanical wear.

Wear causes removal of material which over the time increases clearances, noises, vibrations, power reduction and failure.

Wear influences the residual operating life of the vehicle and its hourly cost and can be monitored for example detecting directly the removal (or reduction) of material, or monitoring the amount and temperature of lubricant present in the machine or specific parts thereof.

In particular it would be desirable to detect wear, temperature and other physical quantities directly within the crawler tracks, but the very harsh environment in which the tracks operates, immersed in mud, water, sand, stones, plants, renders powering sensors and detecting their signals particularly difficult.

Another factor increasing these difficulties is that the parts of the track which are most significant and useful for measurements are continuously moving and sliding relative to the rest of the undercarriage, and touch or rest against fixed parts of the undercarriage only for a negligible part of the operating time.

Thus a need exists for a crawler track, a shoe, a track link, an undercarriage and a heavy duty track vehicle in which one or more sensors, even a great number of them, that can be powered in a simpler and less expensive way, even if such sensors are arranged in places where wired powering is currently difficult.

2

Figure 2:
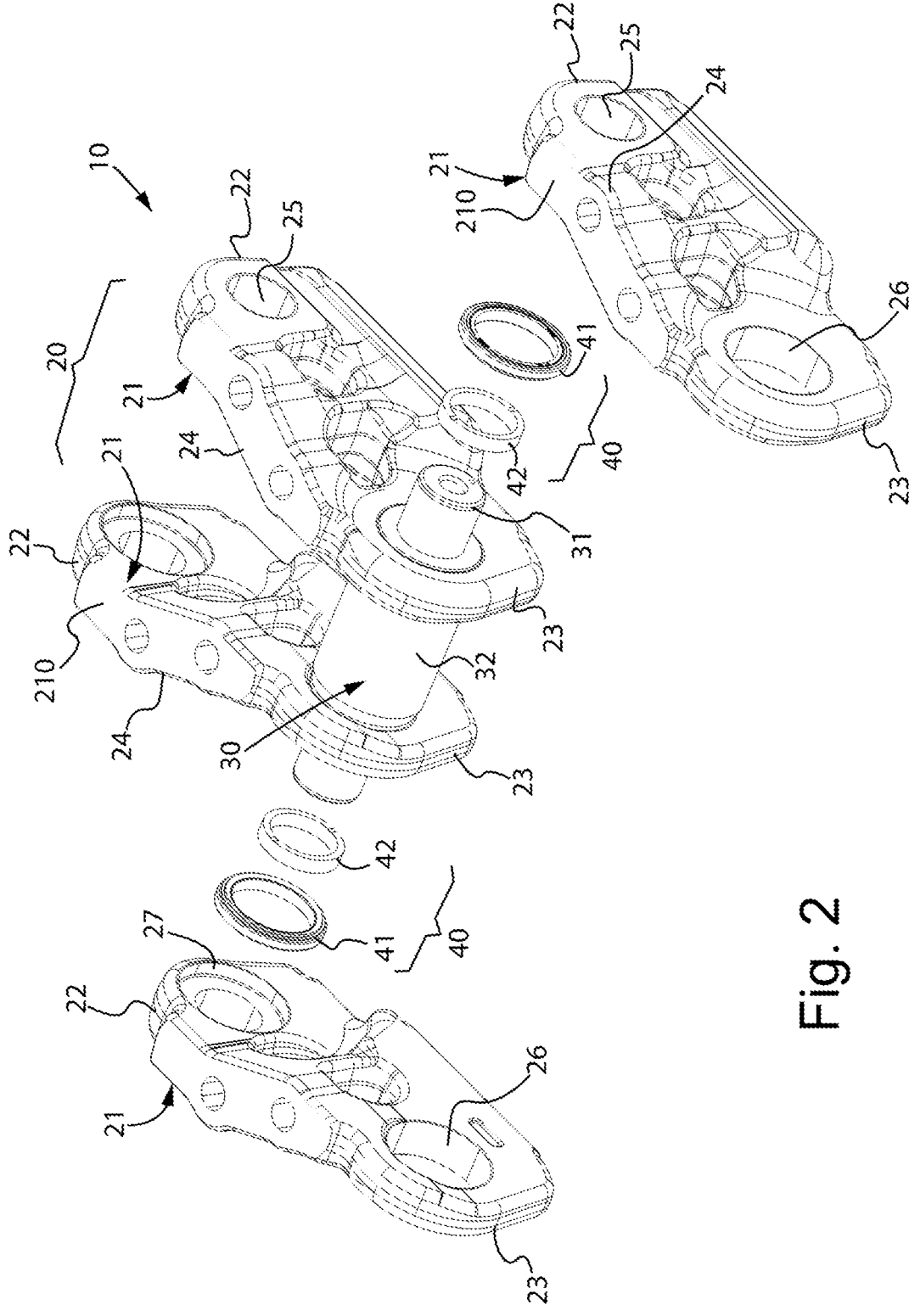
FIG. 2 is a perspective exploded view of two links of the crawler track of FIG. 1.
Figure 3:
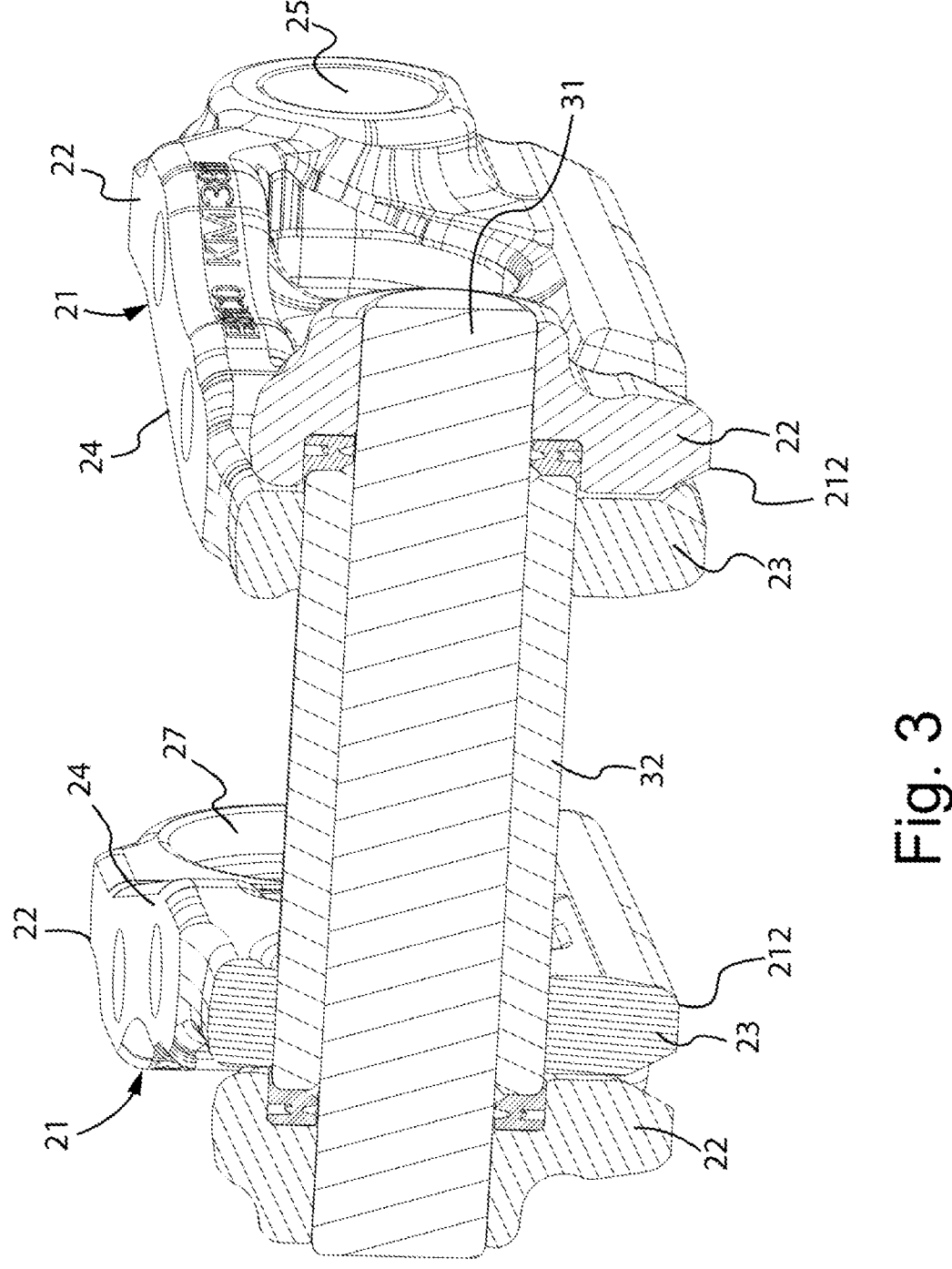

FIG. 3 is a perspective view of a link of FIG. 2, partially sectioned according to an ideal plane crossing an axis of one of the pins.

Figure 4:
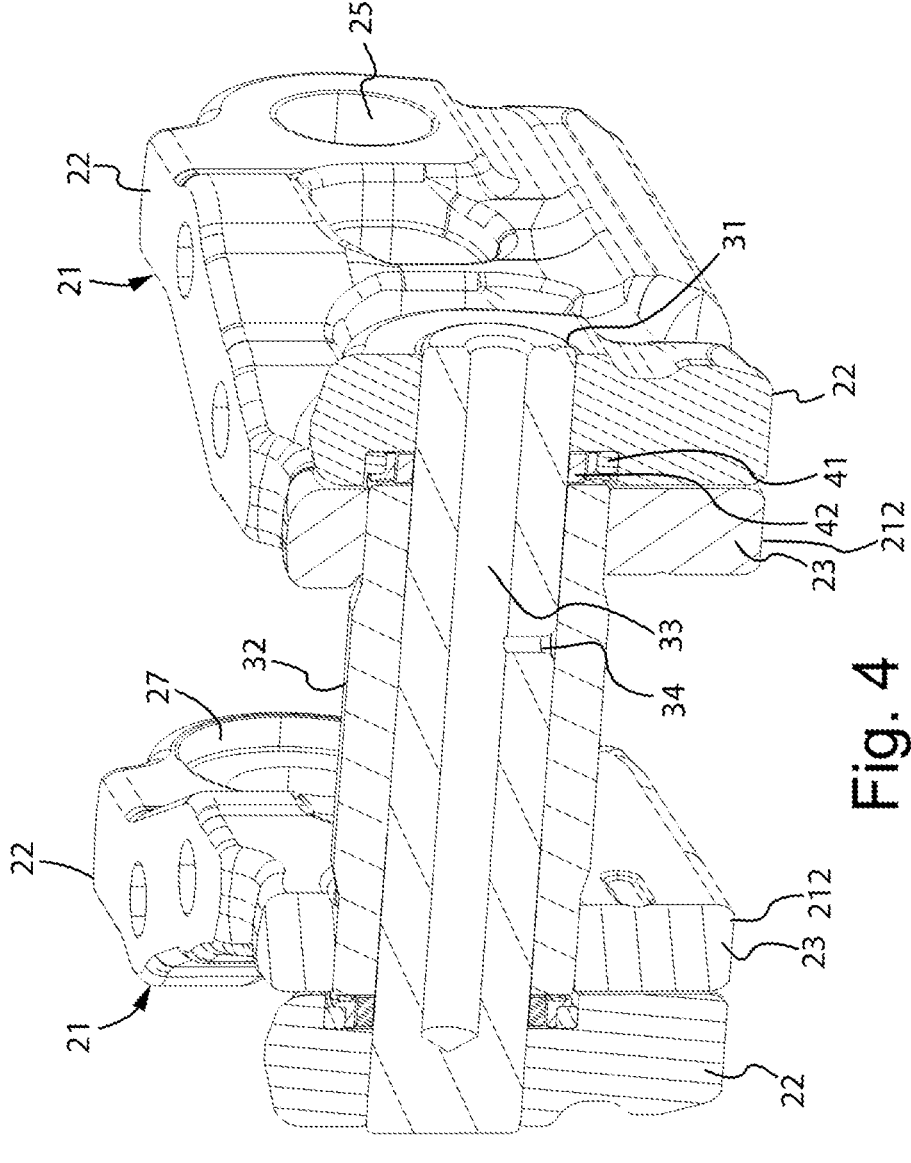

FIG. 4 is a perspective view of a link of a crawler track according a second particular embodiment, partially sectioned according to an ideal plane crossing an axis of one of the pins.

Figure 5:
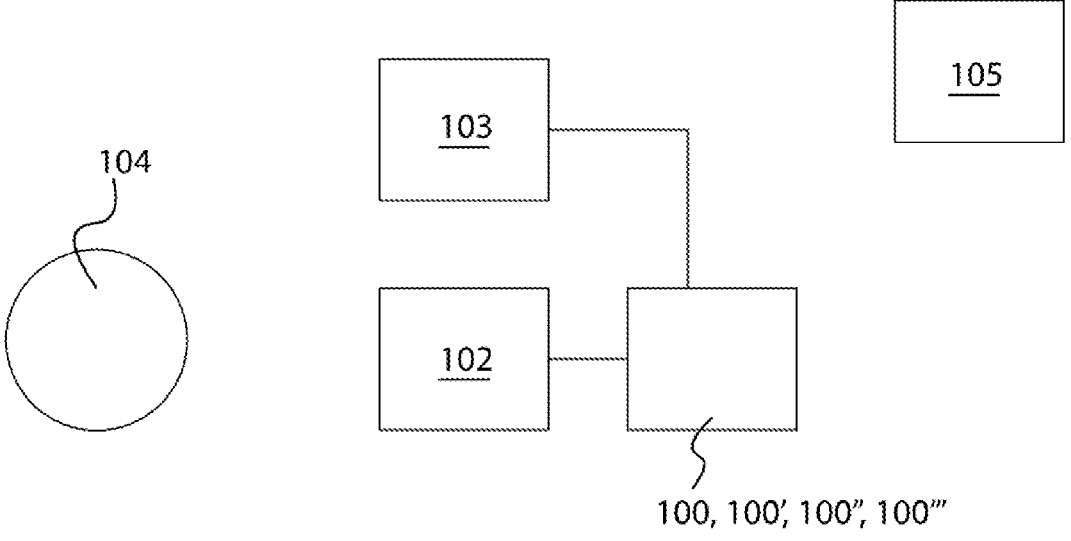

FIG. 5 is a functional diagram of a sensor unit of an example crawler track.

Figure 5A:
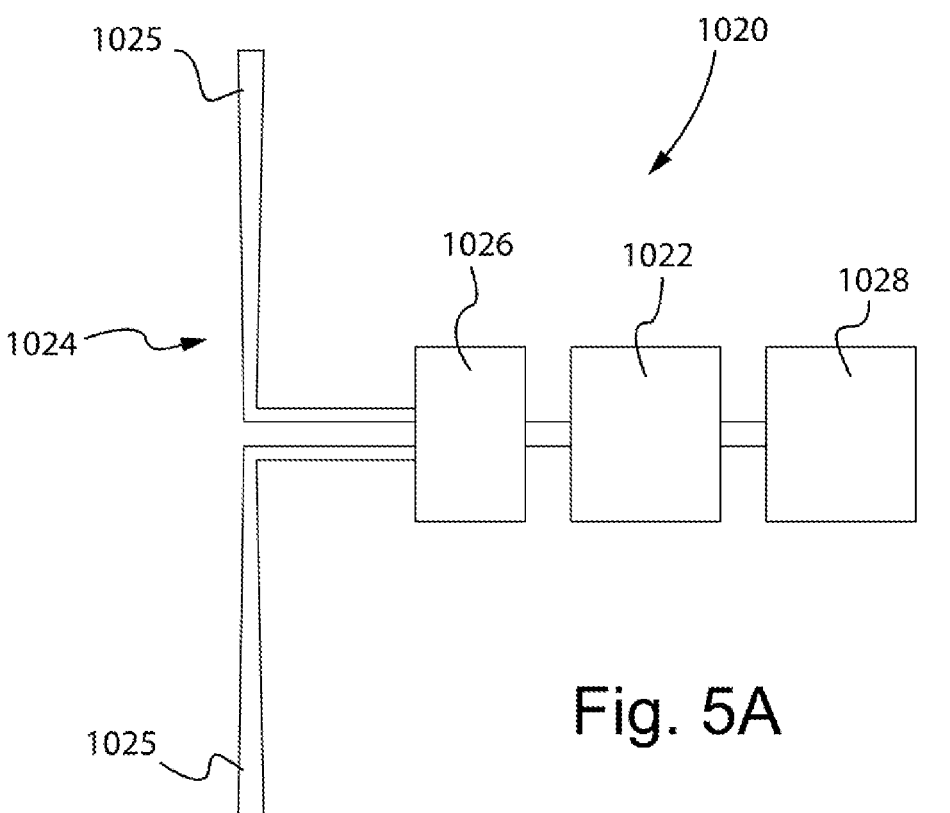

FIG. 5A is a functional diagram of a rectenna of the sensor unit of FIG. 5.

Figure 1:
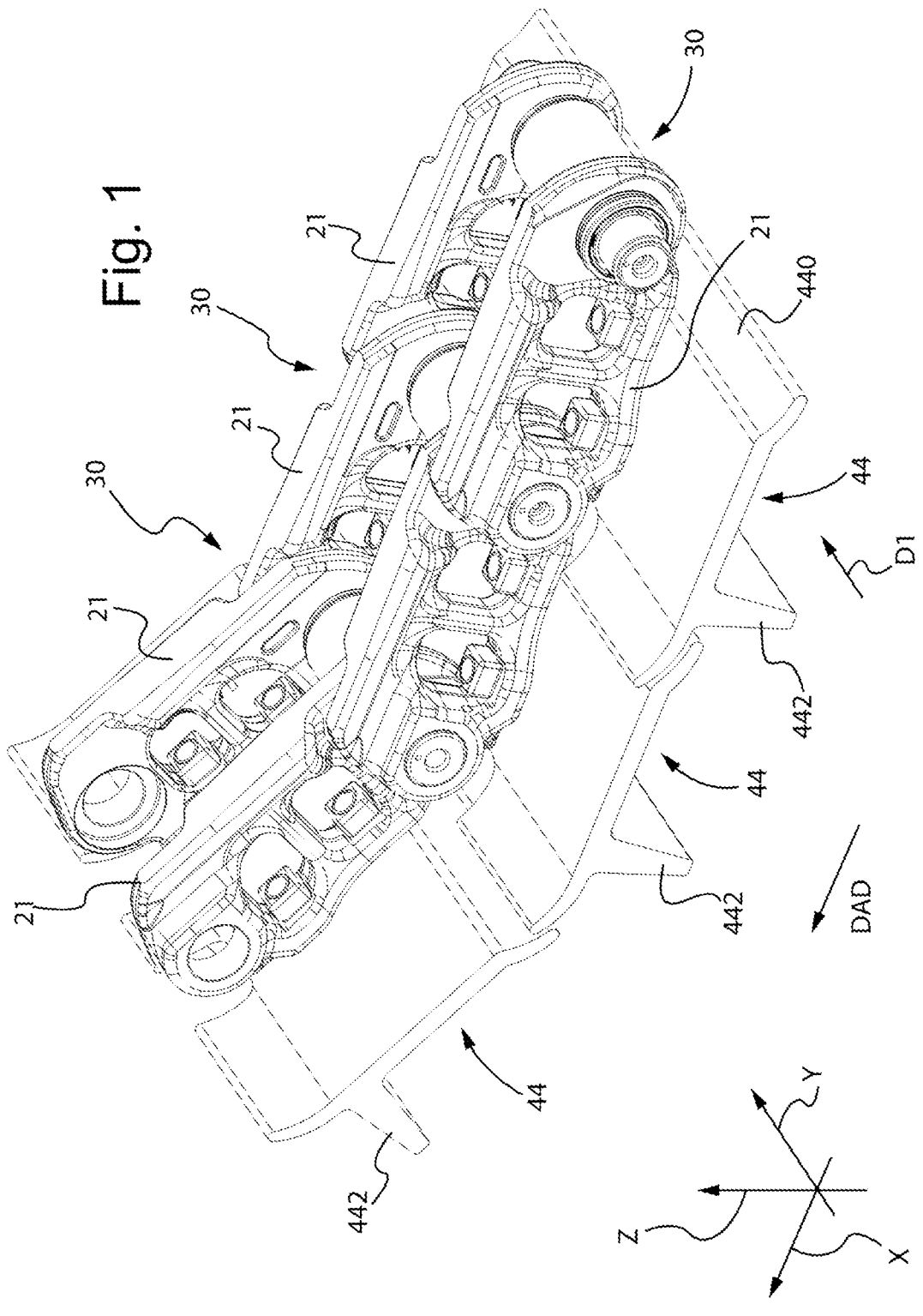
FIG. 1 is a perspective view of a portion of an example crawler track according to a first particular embodiment.
Figure 6:
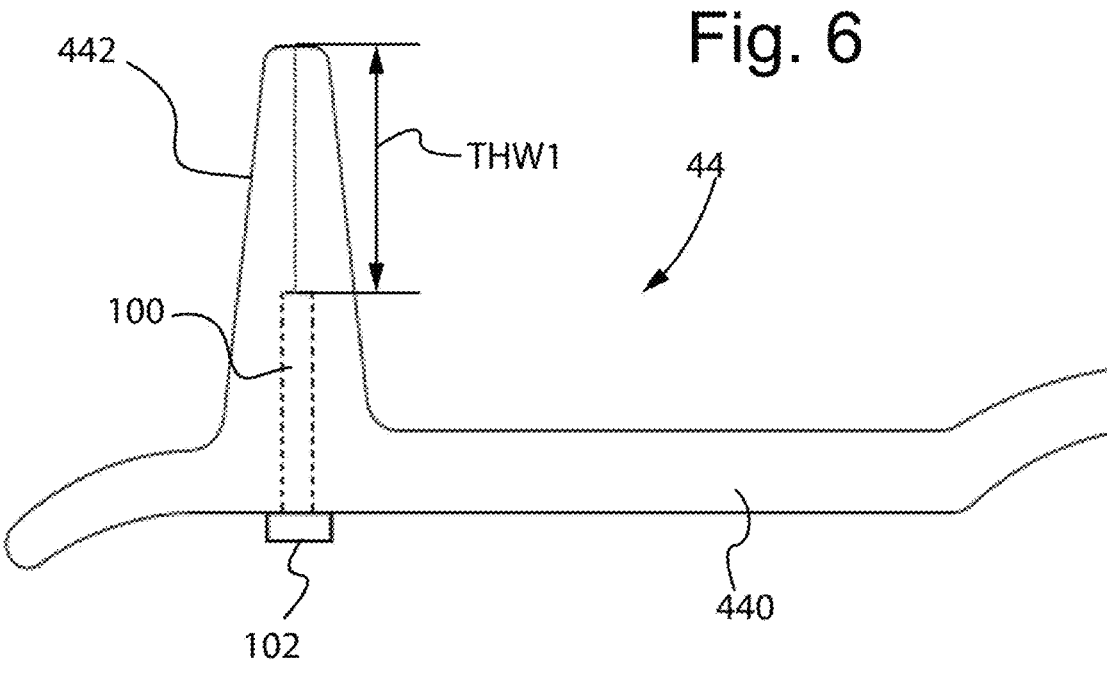

FIG. 6 is a side view, as seen along a direction D1, of a shoe of the crawler track of FIG. 1.

Figure 7:
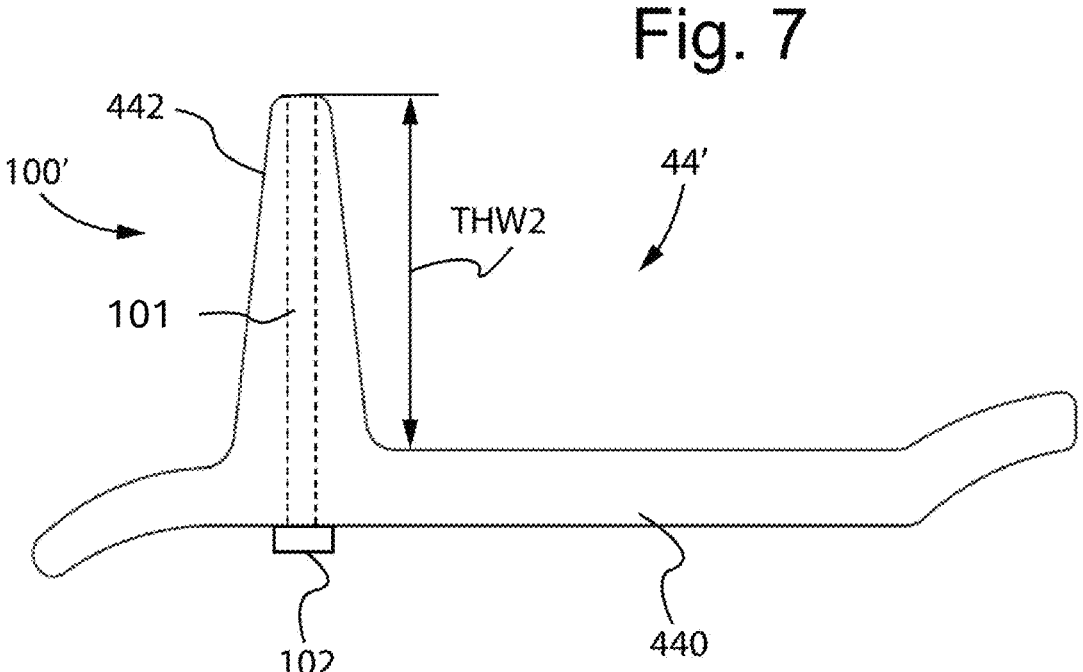

FIG. 7 is a side view, as seen along a direction D1, of a shoe according to a third embodiment.

Figure 8:
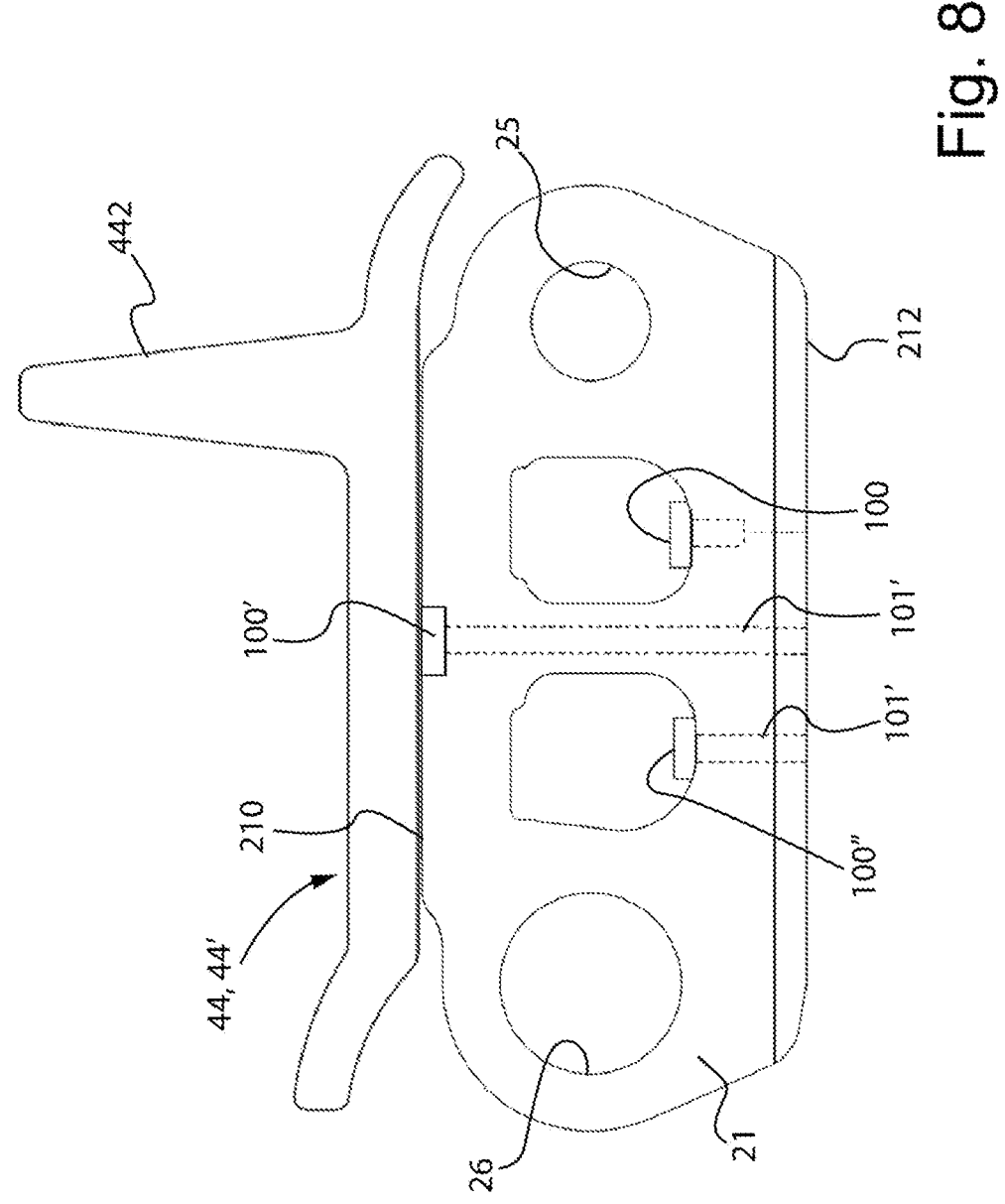

FIG. 8 is a side view, as seen along a direction D1, of a shoe and a track link according to a fourth embodiment.

Figure 9:
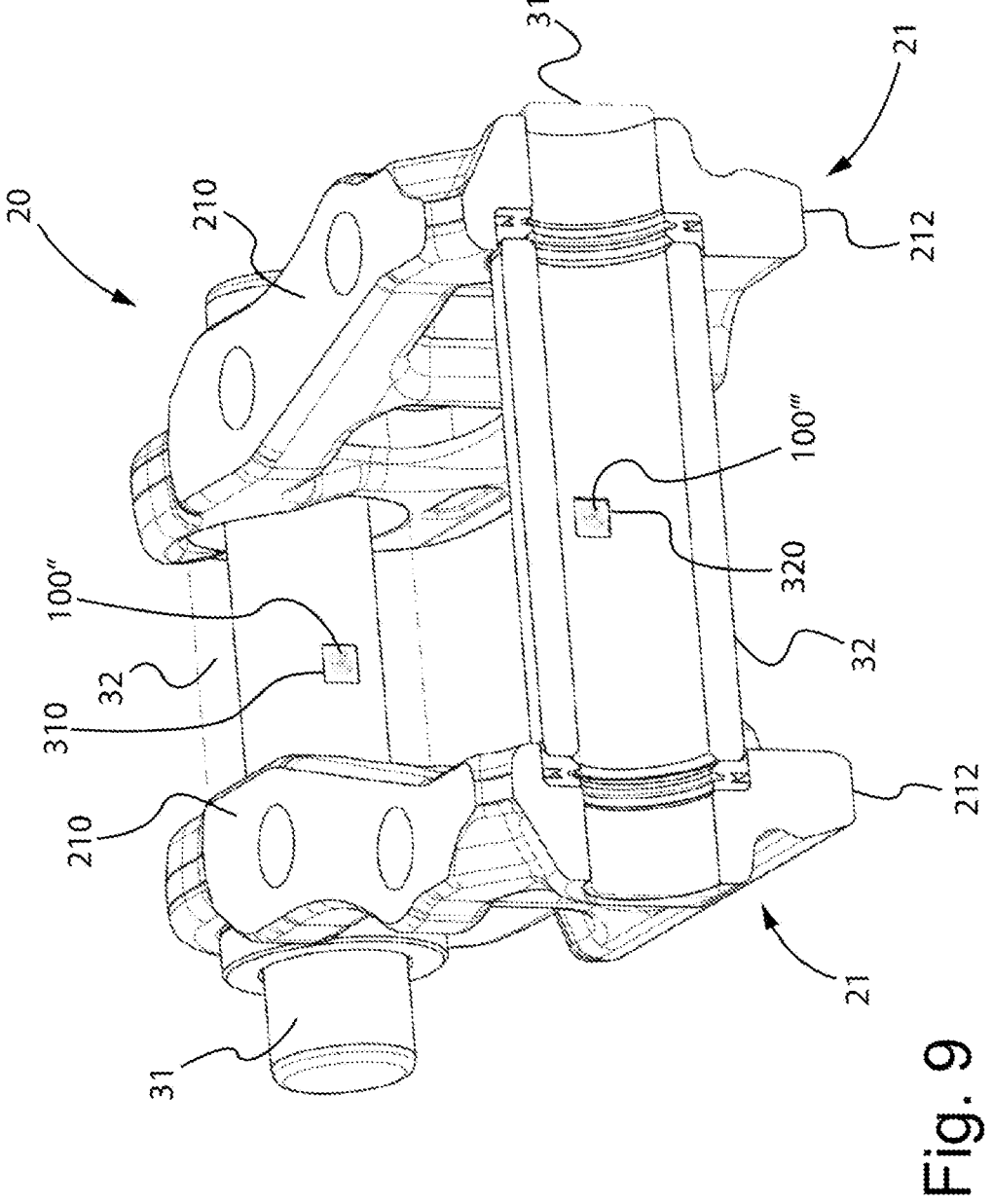

FIG. 9 is a perspective view of a link of a crawler track according to a fifth particular embodiment, partially sectioned according to an ideal plane crossing an axis of one of the pins.

Figure 10:
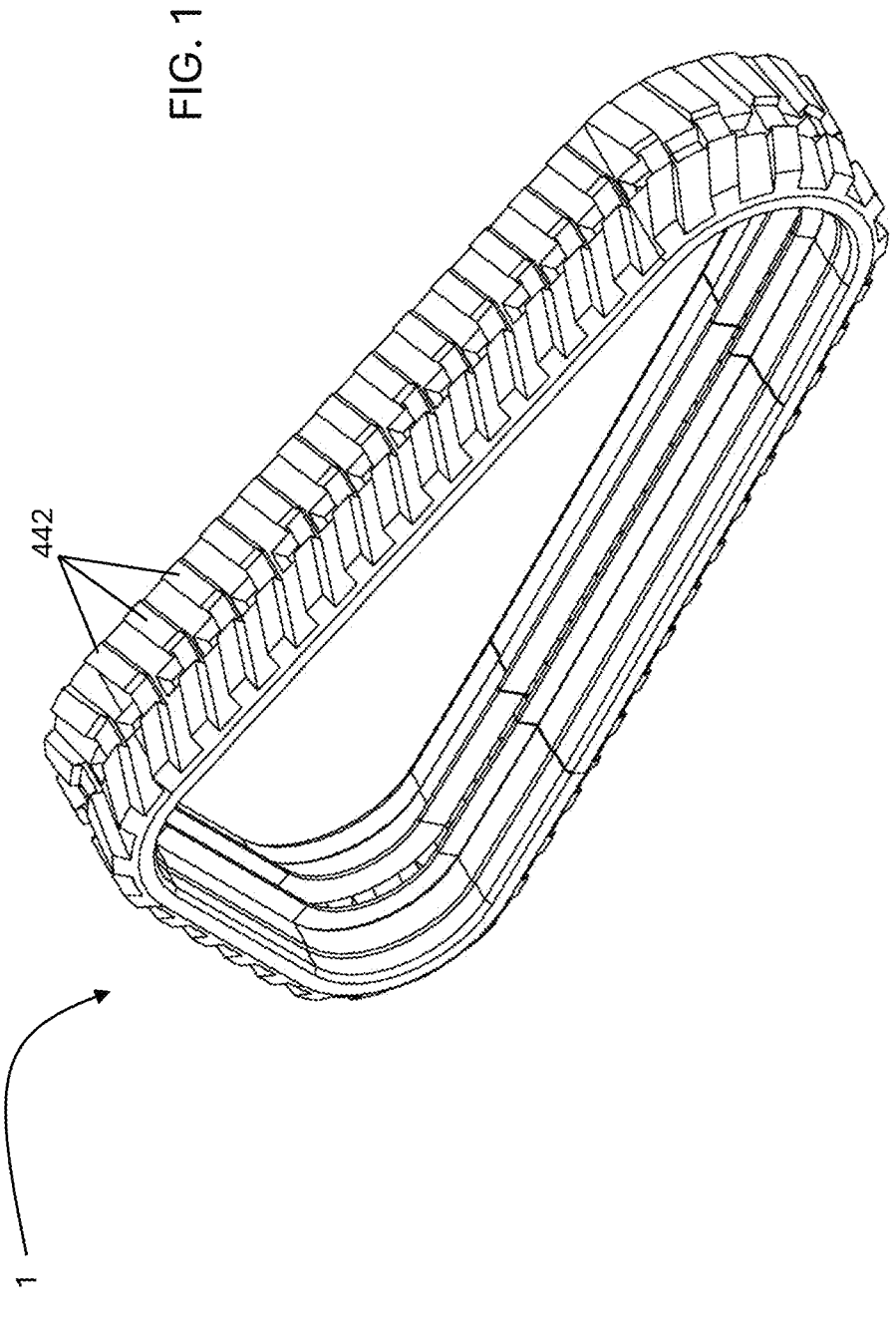

FIG. 10 is a perspective view of a crawler track according to a sixth particular embodiment.

Figure 11:
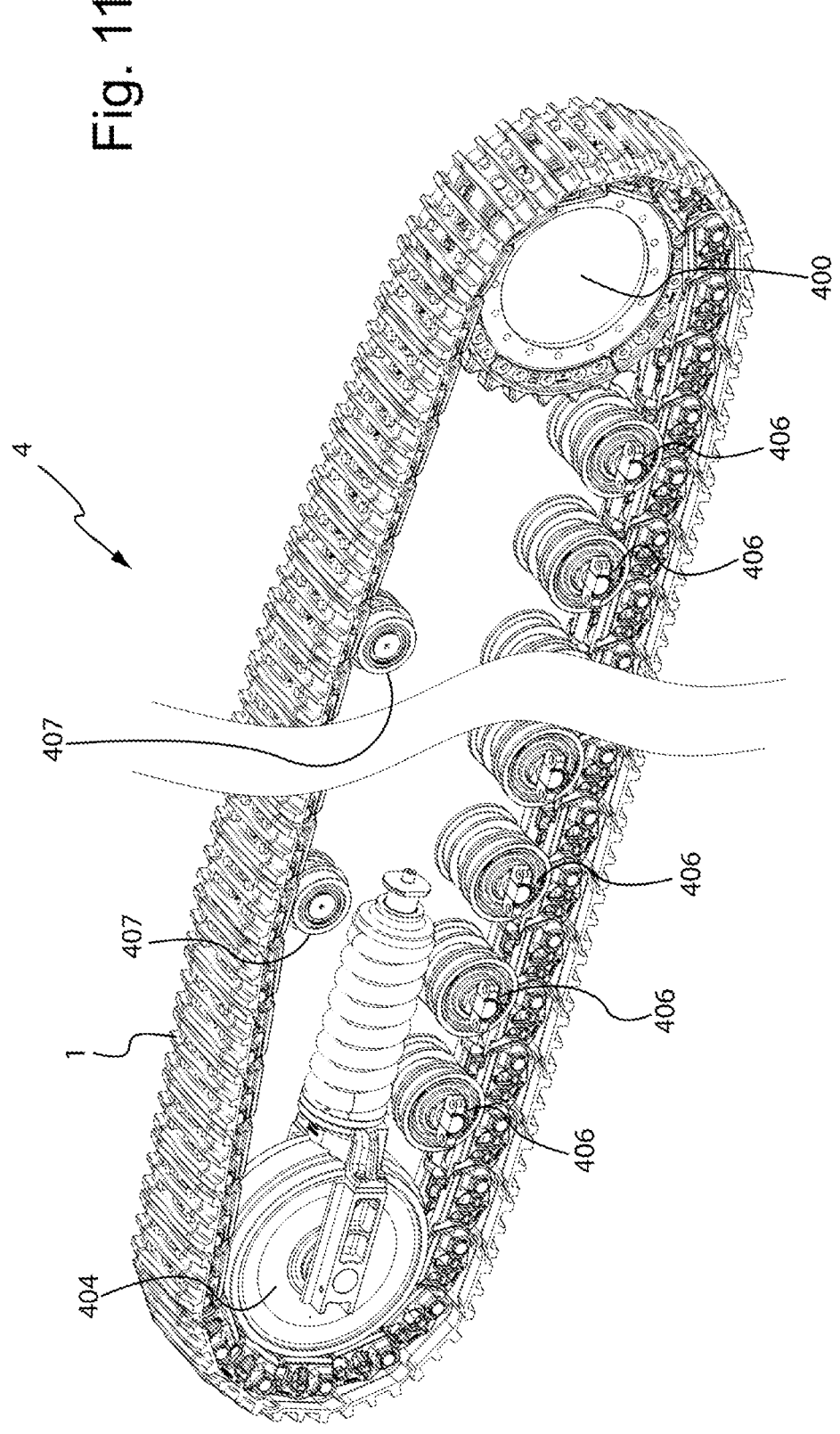

FIG. 11 is a perspective view of an example undercarriage.

Figure 12:
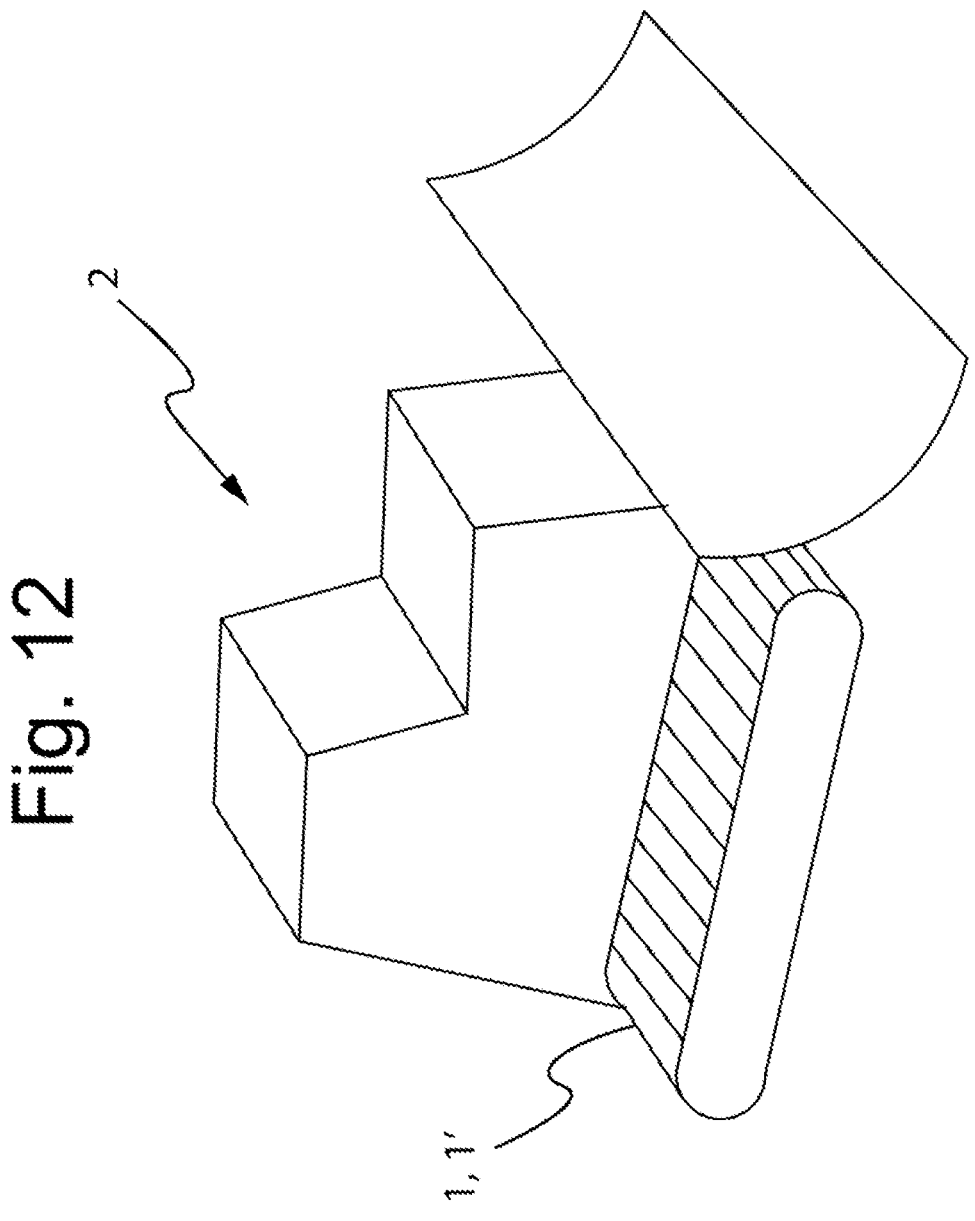

FIG. 12 is a perspective view of a heavy-duty vehicle provided with the crawler track of FIG. 1.

Figure 13:
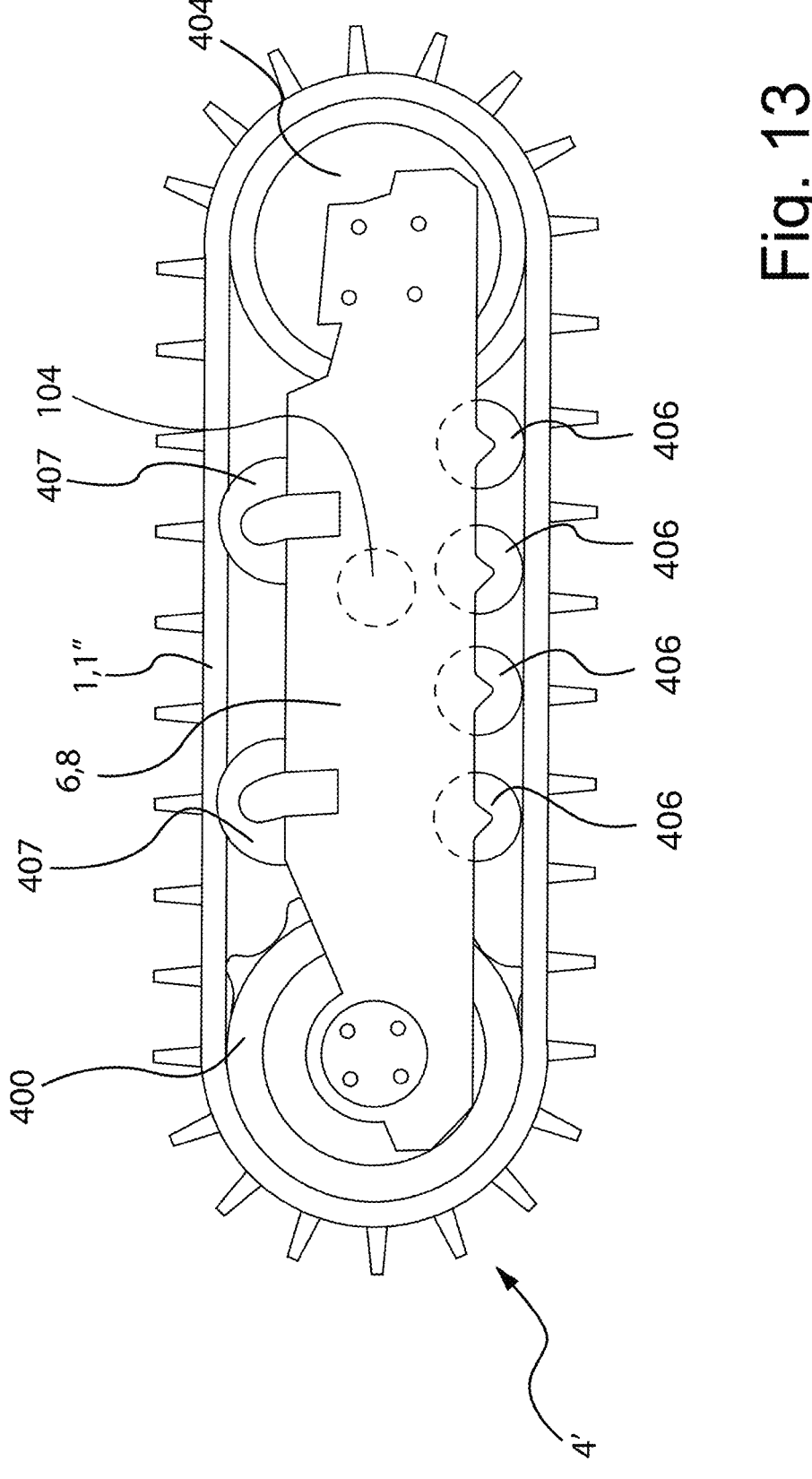

FIG. 13 is a side view of an undercarriage assembly according to a seventh embodiment.

Figure 14:
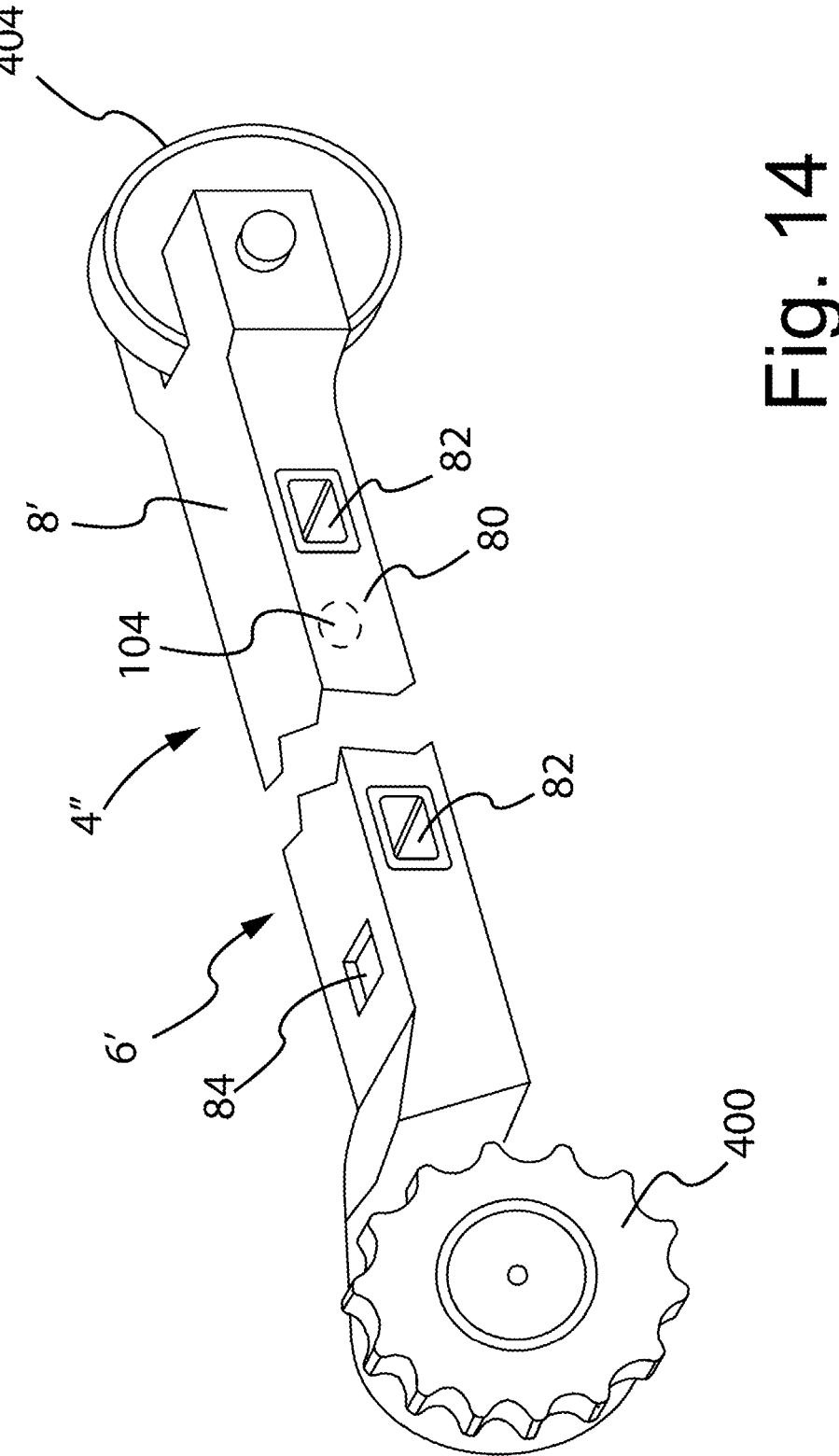

FIG. 14 is a perspective view of a frame shaped as a box-like, hollow beam of an undercarriage assembly according to an eighth embodiment.

Figure 15:
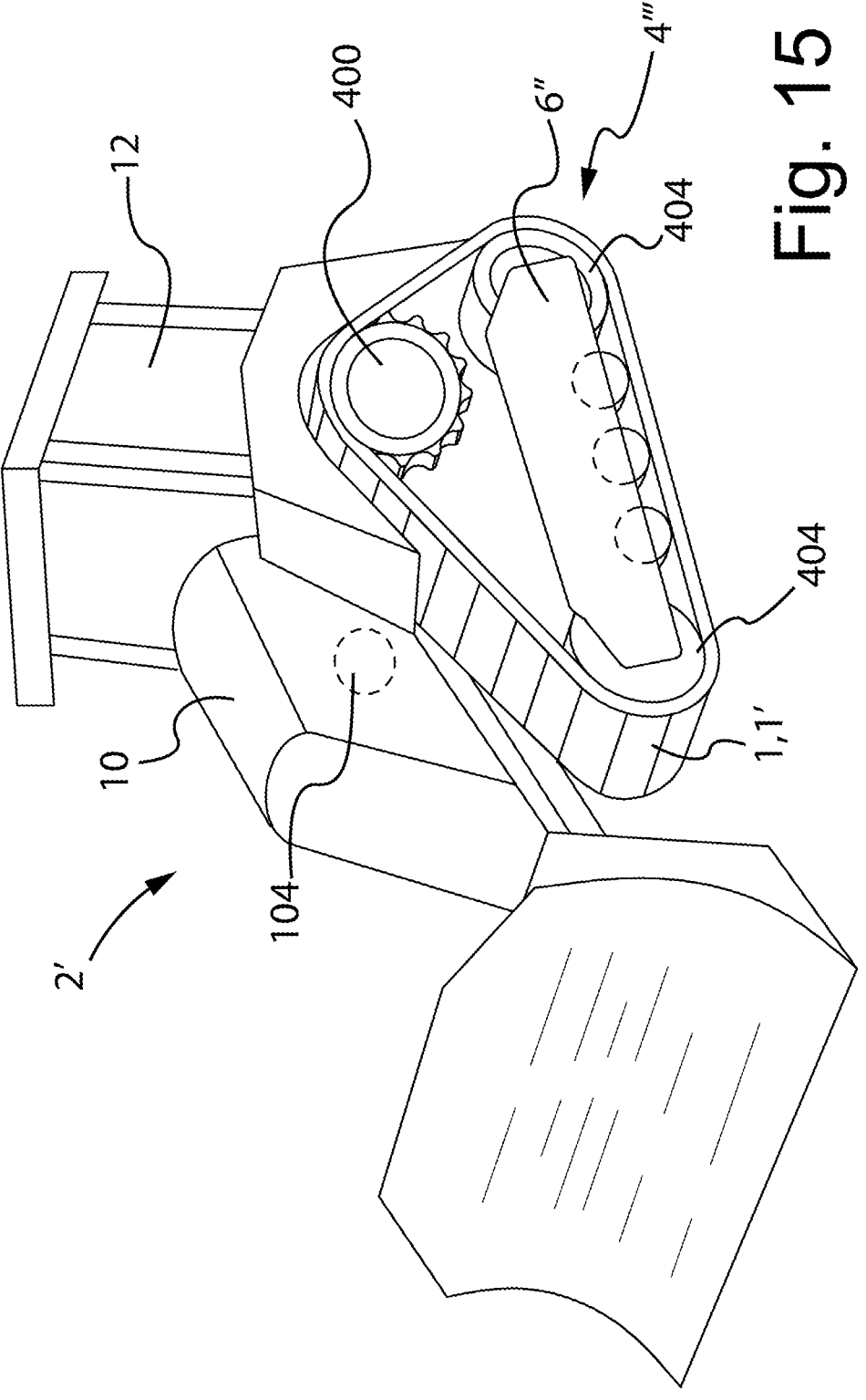

FIG. 15 is a perspective view of a heavy-duty vehicle, namely a bulldozer, according a ninth embodiment.

Figure 16:
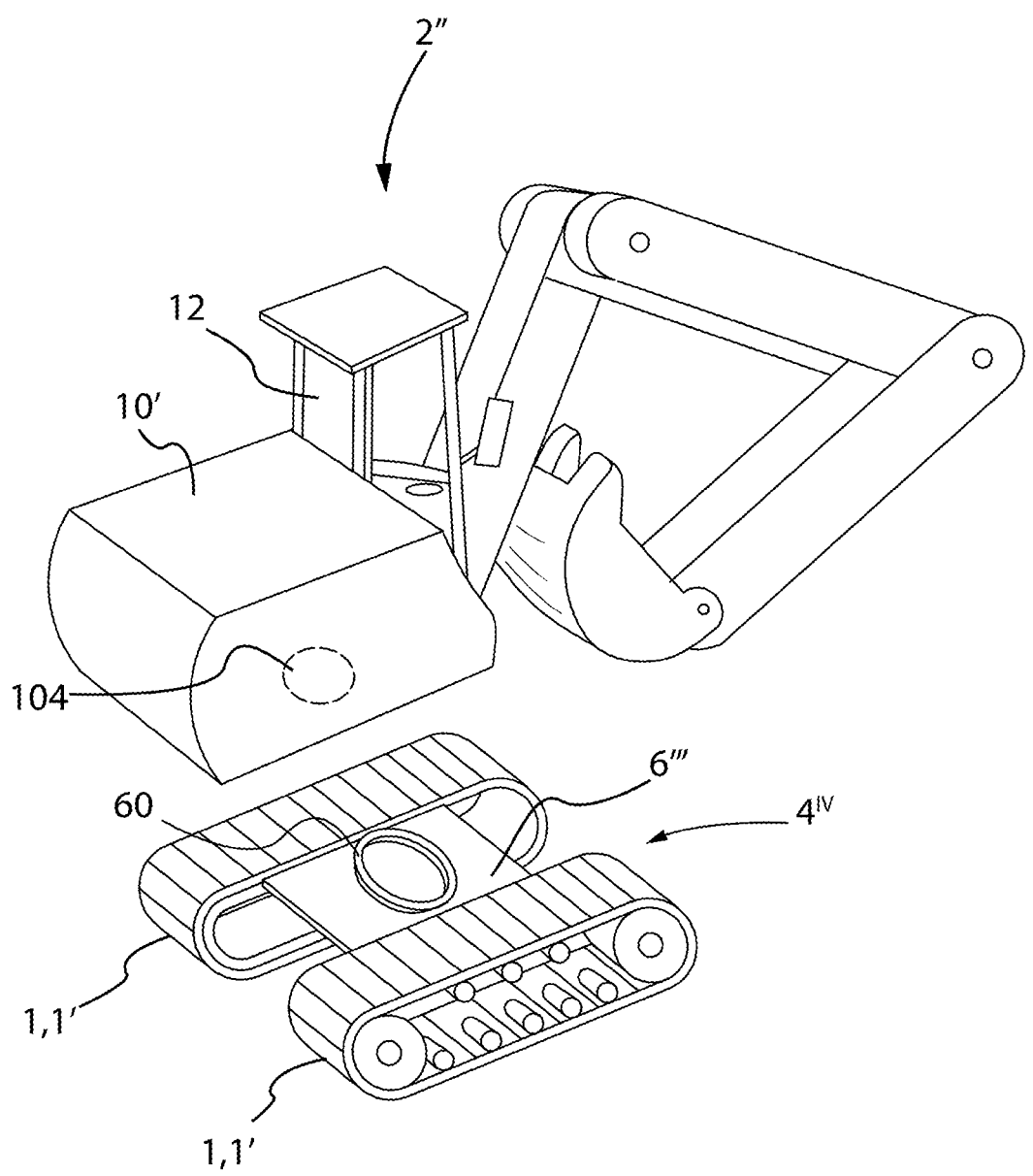

FIG. 16 is a perspective, partially-exploded view of a heavy-duty vehicle, namely an excavator, according a tenth embodiment.

Figure 17:
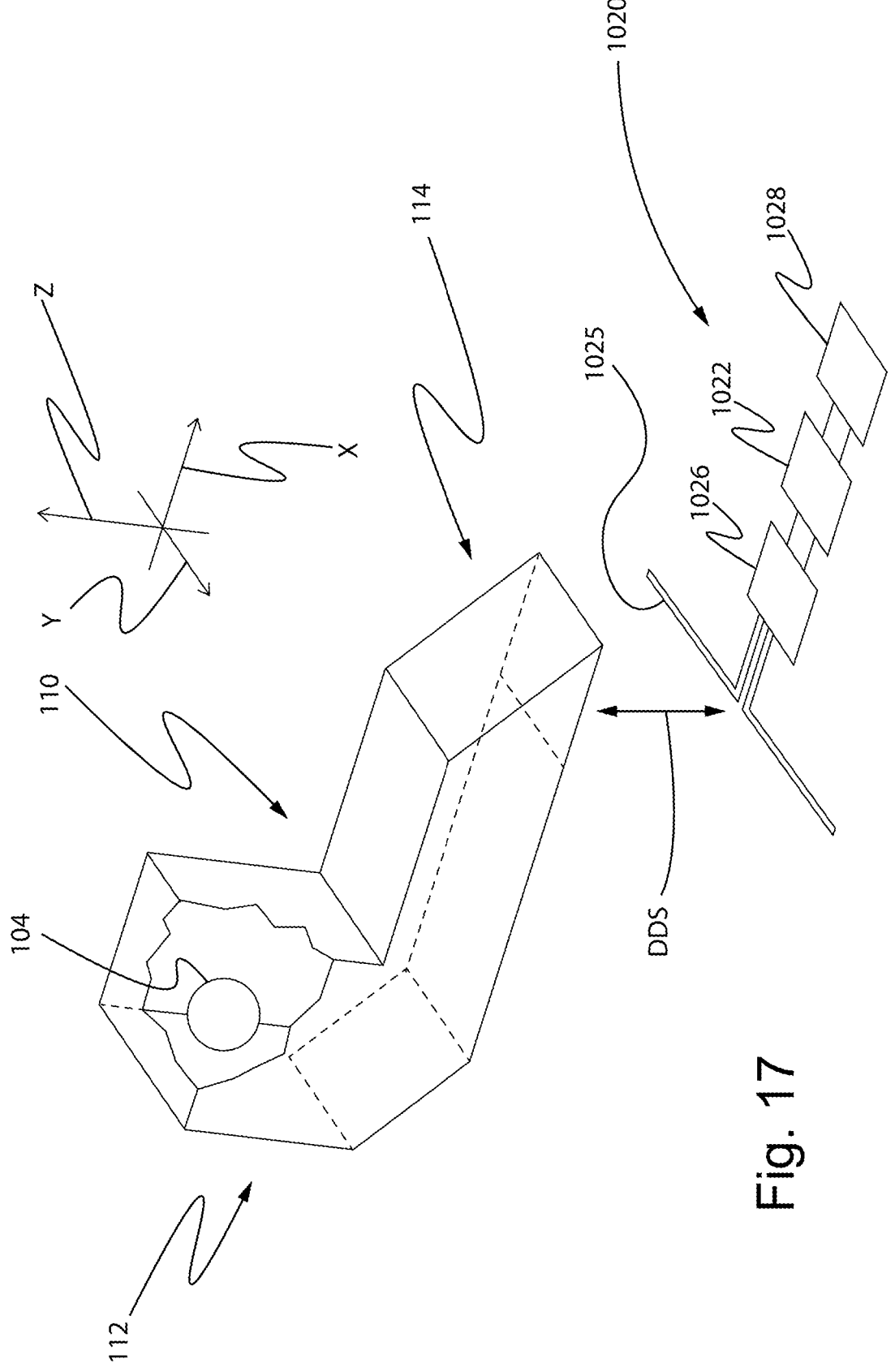

FIG. 17 is a perspective view, partially, broken, of an example microwave waveguide with which the heavy-duty vehicle of FIGS. 12, 15, 16; the undercarriage assembly of FIG. 13; and/or the frame of FIG. 13 can be provided, according to an eleventh embodiment.

Figure 18:
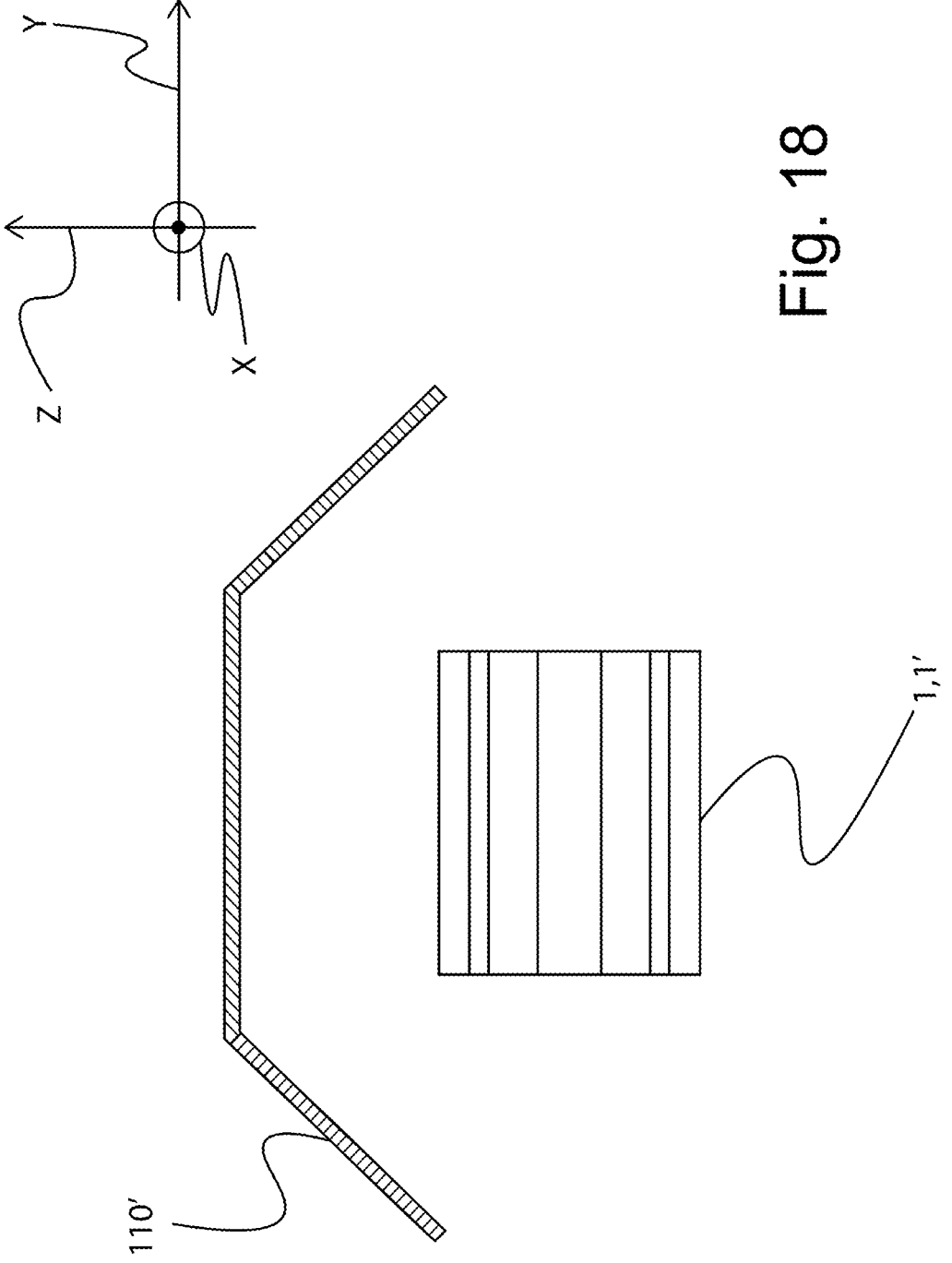

FIG. 18 is a schematic view, partially sectioned and in a direction of observation fore-aft, of a track and a microwave waveguide with which the heavy duty vehicle of FIGS. 12, 15, 16; the undercarriage assembly of FIG. 13; and/or the frame of FIG. 13 can be provided, according to a twelfth embodiment.

Figure 19:
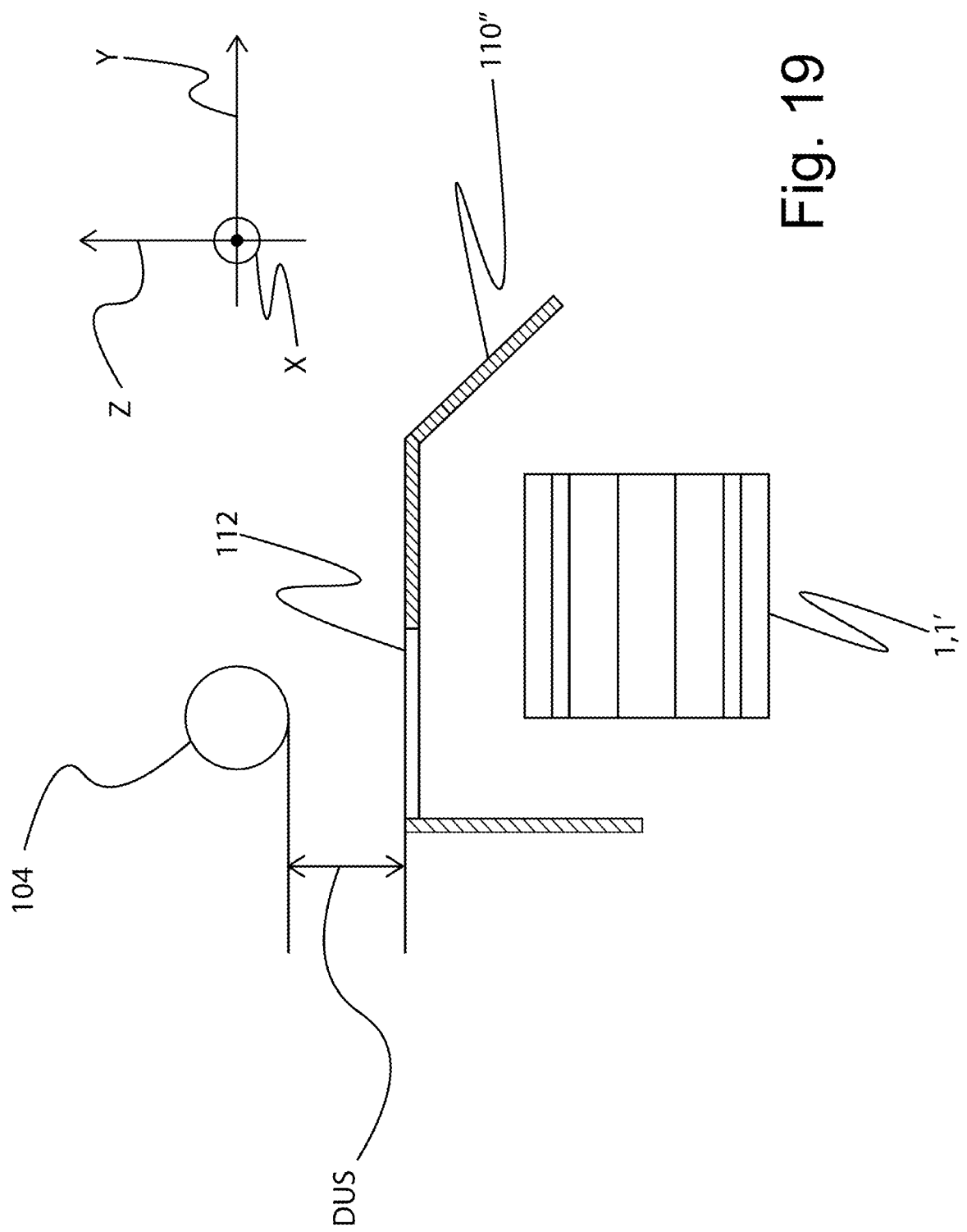

FIG. 19 is a schematic view, partially sectioned and in a direction of observation fore-aft, of a track and a microwave waveguide with which the heavy duty vehicle of FIGS. 12, 15, 16; the undercarriage assembly of FIG. 13; and/or the frame of FIG. 13 can be provided, according to a thirteenth embodiment.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a crawler track provided with a system for powering sensors mounted in or on the crawler track itself. Such sensors can be, for example, wear, temperature, vibration, or noise sensors, accelerometers, and other sensors. The present disclosure also generally relates to a shoe and a link for a crawler track, to an undercarriage, and to a vehicle provided with such crawler track or more generally to a vehicle-such as heavy duty track vehicles such as bulldozers, excavators or mobile drills-provided with the abovementioned sensors.

In some examples, a heavy duty vehicle may comprise:

a crawler track on which the rest of the vehicle can roll so as to move;

at least one sensor configured for detecting a physical quantity of the crawler track itself, of the heavy duty vehicle or of the environment contained or surrounding the crawler track or the heavy duty vehicle;

a power supply unit configured for supplying said sensor with electric power;

wherein the power supply unit comprises a rectenna configured for receiving electromagnetic power from an external electromagnetic source and for supplying said sensor with at least part of said electromagnetic power.

In a heavy duty vehicle according to a particular embodiment of the invention, the crawler track is provided with said at least one sensor.

In a heavy duty vehicle according to a particular embodiment of the invention, said sensor is chosen from the following group: a temperature sensor, a wear sensor configured for detecting the wear of a part of the crawler track, a pressure sensor, a load cell, an accelerometer, a noise-, vibration or ultrasound sensor, a receiver of a global positioning system such as GPS, GLONASS, GALILEO or BEIDOU.

This measure allows a great variety of physical quantities of the track, for example of its parts such as the shoe, the track links and the track pins, be measured and monitored, allowing for example an improved predictive maintenance of the track and of the vehicle.

In a heavy duty vehicle according to a particular embodiment of the invention, said crawler track comprises at least one shoe configured for being laid on a floor or ground on which the crawler track can move forward, wherein the at least one shoe comprises:

a main plate;

at least one advancement rib protruding from the main plate;

wherein said at least one sensor is a wear sensor configured for detecting the wear of the advancement rib.

This measure makes it possible more direct and for example continuous and in real time detection of physical quantities of the shoe, that is a particularly stressed part of a track, and an enhanced predictive maintenance of the shoe and of the track in general, in spite of the difficulties of arranging and powering sensors on the shoe itself.

In a heavy duty vehicle according to a particular embodiment of the invention, said crawler track comprises a plurality of track links connected together to as to form a chain extending along the crawler track itself, wherein:

the track links are configured for resting on a floor or ground;

the at least one sensor is:

a wear sensor configured for detecting wear of one of the track links or another part of the crawler track;

a temperature sensor configured for detecting the temperature of one or more of the track links or of the other parts or environment surrounding said temperature sensor.

In a heavy duty vehicle according to a particular embodiment of the invention, at least one of said track links is fixed to said at least one shoe and is configured for resting on said shoe, and said wear sensor is configured for detecting wear of one or more of said track links and/or of said at least one shoe.

In a heavy duty vehicle according to a particular embodiment of the invention, said crawler track comprises a plurality of hinge pins connecting said track links so as to form an articulated chain, wherein said at least one sensor is a temperature sensor configured for measuring the temperature of at least one of said hinge pins.

This measure makes possible more direct and for example continuous and in real time detection of a very relevant physical quantity of a crawler track, and an enhanced predictive maintenance of another kind of particularly stressed parts of a track, that is its pins, in spite of the difficulties of arranging and powering sensors on or in the pins themselves.

In a heavy duty vehicle according to a particular embodiment of the invention, said temperature sensor is arranged in or on one of said hinge pins.

In a heavy duty vehicle according to a particular embodiment of the invention:

the crawler track forms an internal main face and an external main face and at least one advancement rib protruding transversally from the external main face;

the external main face is configured for resting on a floor or ground on which the crawler track can move forward;

said at least one sensor is a wear sensor configured for detecting the wear of the advancement rib.

In a heavy duty vehicle according to a particular embodiment of the invention, the at least one advancement rib extends transversally to the direction of forward motion of the crawler track or transversally to the crawler track itself.

In a particular embodiment of the invention, the heavy duty vehicle comprises an external electromagnetic source configured for emitting microwaves suitable for powering said rectenna.

In a heavy duty vehicle according to a particular embodiment of the invention, said external electromagnetic source is mounted on, that is fixed to, a part of said heavy duty vehicle different from said crawler track.

In other words, in a heavy duty vehicle according to a particular embodiment of the invention, said external electromagnetic source is mounted on, that is fixed to, a part of said heavy duty vehicle outside of and/or separate from said crawler track.

This way the external electromagnetic source can be arranged in a zone of the vehicle easier to be powered through electric cables of other electric power lines, and at the same time can power sensors arranged in vehicle parts, such as the crawler tracks and their parts, which are much more difficult to be supplied with electric power when the vehicle moves, allowing for example constant real time monitoring of wear, temperature and other local physical quantities of the crawler tracks.

In a particular embodiment of the invention, the heavy duty vehicle comprises a monocoque or bodywork containing a compartment for the vehicle driver and/or a main engine configured for propelling the whole vehicle.

In a particular embodiment of the invention, said monocoque or bodywork is supported by and/or mounted on and/or fixed to said undercarriage assembly.

In a heavy duty vehicle according to a particular embodiment of the invention, said external electromagnetic source is contained in and/or mounted on, that is fixed to, said monocoque or bodywork.

In some embodiments, this purpose is achieved with a crawler track.

In other words, in a second aspect of the present invention this purpose is achieved with a crawler track of a vehicle, comprising:

at least one sensor configured for detecting a physical quantity of the crawler track itself or of the environment contained or surrounding the crawler track;

a power supply unit configured for supplying said sensor with electric power;

wherein the power supply unit comprises a rectenna configured for receiving electromagnetic power from an external electromagnetic source and for supplying said sensor with at least part of said electromagnetic power.

This way more direct and for example continuous and in real time detection of physical quantities of the track can be achieved, and an enhanced predictive maintenance of the track in general, in spite of the difficulties of arranging and powering sensors on the track.

In some embodiments, this purpose is achieved with a shoe for a crawler track.

In other words, in a third aspect of the present invention, this purpose is achieved with a shoe for a crawler track of a heavy duty vehicle, comprising:

at least one sensor configured for detecting a physical quantity of the shoe itself or of the environment contained or surrounding the shoe;

a power supply unit configured for supplying said sensor with electric power;

wherein the power supply unit comprises a rectenna configured for receiving electromagnetic power from an external electromagnetic source and for supplying said sensor with at least part of said electromagnetic power.

This measure allows more direct and for example continuous and in real time detection of physical quantities of the shoe, that is a particularly stressed part of a track, and an enhanced predictive maintenance of the shoe and of the track in general, in spite of the difficulties of arranging and powering sensors on the shoe itself.

In some embodiments, this purpose is achieved with a track link for a crawler track.

In other words, in a fourth aspect of the present invention, this purpose is achieved with a track link of a crawler track of a heavy duty vehicle, comprising:

at least one sensor configured for detecting a physical quantity of the track link itself or of the environment contained in or surrounding the track link;

a power supply unit configured for supplying said sensor with electric power;

wherein the power supply unit comprises a rectenna configured for receiving electromagnetic power from an external electromagnetic source and for supplying said sensor with at least part of said electromagnetic power.

This measure makes possible more direct and for example continuous and in real time detection of a very relevant physical quantity of a crawler track, and an enhanced predictive maintenance of another kind of particularly stressed parts of a track, that is its links, in spite of the difficulties of arranging and powering sensors on the links themselves.

In some embodiments, this purpose is achieved with an undercarriage assembly for a crawler track.

In other words, in a fifth aspect of the present invention, this purpose is achieved with an undercarriage assembly for a heavy duty track-type vehicle such as a bulldozer, excavator, mobile drills or other heavy equipment vehicles, the undercarriage assembly comprising a crawler track as previously defined and an external electromagnetic source configured for emitting microwaves suitable for powering said rectenna.

In a particular embodiment of the invention, said external electromagnetic source is mounted on, that is fixed to, a part of said undercarriage assembly different from said crawler track.

This way a more direct and for example continuous and in real time detection of physical quantities of the crawler track and an enhanced predictive maintenance of the track can be achieved, in spite of the difficulties of arranging and powering sensors on the track itself when the vehicle moves.

In a particular embodiment of the invention, said undercarriage assembly comprises one or more of the following parts: a frame, wheels such as idle wheels or driving wheels, pulleys rollers on which the track is mounted and/or over or under which said track rolls and/or runs, possible motors or other actuators, gearboxes or joints driving the tracks, power supply lines such as electric or hydraulic power lines powering said motors or other actuators.

In an undercarriage assembly according to a particular embodiment of the invention, said external electromagnetic source is mounted on, that is fixed to, said frame.

Further features and advantages of the crawler track, shoe, track link and vehicle according to the invention will become clearer from the following non limiting description, with reference to the enclosed schematic drawings.

DETAILED DESCRIPTION

FIGS. 1-3, 5, 5A, 6, 11 relate to a first particular embodiment of the present invention.

Like for example in FIG. 1, a crawler track 1 according to a particular embodiment of the invention can comprise a sequence of track links 20 connected to each other through a plurality of articulated joints 30 each of which can comprise for example a pin 31 (FIGS. 2-4).

Each pin 31 can be for example inserted in a bushing 32 so as to allow two track links to be rotatably connected one to another.

Each track link 20 can comprise for example a pair of two opposite plates 21.

Each plate 21 can form a first end portion 22 and a second end portion 23 parallel to each other and preferably connected to each other by a transversal portions 24.

The plates 21 can be shaped in such a way that, when the track link 20 is assembled, the interspace between the first end portions 22 of the pair of the plates 21 of each track link 20 is greater than the interspace between the second end portions 23.

The first end portion 22 and the second end portion 23 are provided with respective through holes 25, 26 for being connected to the pin 31 and to the bushing 32 respectively.

The first end portion 22 can be provided with an annular groove 27 around its through hole 25.

Such annular groove preferably has an internal diameter which is greater than the internal diameter of the through holes 25.

The annular grooves 27 preferably house a respective sealing system 40.

The track 1 can be of the lubricated type or of the grease type.

As shown for example in FIG. 3, in a track 1 of the grease type some lubricating grease can be provided between the inner surface of the bushings 32 and the outer surface of the respective pins 31, the sealing system 40 can comprise for example an annular sealing 41, preferably made of polyurethane, that engages with the ends of the pin 31, and a spacer ring 42 preferably made of metal.

As shown for example in FIG. 4 in a track 1 of the lubricated type, the pins 31 can be provided with an internal duct 33 opened at one end of the pin 31 and in fluidic communication with the outside of the pin 31 through one secondary duct 34 at the region covered by the relative bushing 32.

Then, during the normal operation of the track the lubricant can enter the duct 33 through the open end of the pin 31 and exit through the secondary duct 34.

Each row of track links 20 connected together forms a sort of chain.

The plates 21, pins 31 and bushings 32 are preferably made of steel or another metal.

The crawler track 1 further comprises a plurality of shoes 44 (FIGS. 1, 6), each of which is fixed to a respective track link 20.

The shoes 44 can be made of steel or another metal, or of a suitable polymeric material, such as relative hard plastic or rubber.

Each shoe 44 is preferably fixed to a face of the respective track link lying substantially parallel or longitudinal to the advance direction DAD of the track link 20 during the normal operation.

Each shoe 44 preferably comprises:

a main plate 440; and at least one advancement rib 442 protruding from the main plate 440, preferably extending perpendicularly or however transversally to the advance direction DAD of the track link 20 and the shoe 44 itself;

Each advancement rib 442 can lie substantially in a plane of other ideal surface perpendicular to the advance direction DAD of the track link 20 and the shoe 44 itself.

Each main plate can have a substantially planar overall shape.

Each advancement rib 442 can have the shape of a wall, for example substantially planar and possibly tapered.

The crawler track 1 can be mounted on, that is fixed to, a vehicle such as a bulldozer (FIG. 12), excavator, mobile drill or other heavy duty track vehicle.

More particularly the crawler track 1 can be part of an undercarriage assembly of a vehicle.

The wording "undercarriage assembly" in the present description means an assembly comprising one or more tracks allowing the vehicle to move, and a frame and possible wheels, pulleys or rollers on which the track or tracks are mounted, possible motors or other actuators, gearboxes of joints driving the tracks, possible power supply lines such as electric or hydraulic power lines powering said motors or other actuators.

For example said wheels, pulleys or rollers can be mounted on, that is fixed to, said frame.

Said frame 6, 6', 6", 6'" can comprise for example one or more beams 8, 8' and/or one or more plates, such as metal plates (FIGS. 13, 14).

Said beams 8, 8' and/or frame 6, 6', 6", 6'" can have for example an overall tubular, box-like or more generally hollow shape (FIGS. 13, 14).

Said wheels—such as for example the one or more driving wheel 400 and/or the one or more idle main wheel 404 mentioned hereinafter-, pulleys or rollers—such as for example the track rollers 406 and/or carrier rollers 407 mentioned hereinafter—can be mounted on, that is fixed to, said one or more beams 8, 8' and/or one or more plates of the frame 6, 6', 6", 6'".

The plate or plates 80 can be substantially planar (not shown) of forming a non-planar shell having a single or double curvature (FIG. 14).

The plate or plates 80 can form a barrier provided with or lacking holes 82 and cut out zones 84.

In embodiments not shown, the frame can form for example substantially a lattice structure and/or a hull-shaped shell.

An example of undercarriage 4 is shown in FIG. 11, comprising a track 1, one driving wheel 400, one idle main wheel 404, a plurality of track rollers 406 and a plurality of carrier rollers 407.

More generally, an undercarriage can comprise one or more of the following elements:

a track 1, a driving wheel 400, an idle main wheel 404, one or more track rollers 406, one or more carrier rollers 407.

According to an aspect of the present invention, a heavy duty vehicle 2, 2', 2" can comprise the crawler track 1 and:

at least one sensor 100, 100', 100", 100$^{III}$ configured for detecting a physical quantity of the crawler track 1 itself, of the heavy duty vehicle 2, 2', 2" or of the environment contained or surrounding the crawler track 1 or the heavy duty vehicle 2;

a power supply unit 102 configured for supplying said sensor 100, 100', 100", 100$^{III}$ with electric power.

According to a particular embodiment of the invention, the crawler track 1, 1' can be provided with said at least one sensor 100, 100', 100", 100$^{III}$.

The power supply unit 102 comprises a rectenna 1020 configured for receiving electromagnetic power from an external electromagnetic source 104 and for supplying said sensor 100, 100', 100", 100$^{III}$ with at least part of said electromagnetic power.

The external electromagnetic source 104 is preferably a source of electromagnetic microwaves, having a frequency preferably comprised between 300 Mhz-300 GHz.

The external electromagnetic source 104 can be configured for emitting electromagnetic microwaves, having a frequency preferably comprised in one or more of the following ranges: 300-599 MHz, 600-899 MHz, 900-Mhz-1 GHz, 1-10 GHz, 11-40 GHz, 41-60 GHz, 61-80 GHz, 81-100 GHz, 101-150 GHz, 151-200 GHz, 201-250 GHz, 251-300 GHz.

The rectenna 1020 (FIG. 5A) preferably comprises an antenna 1024 and a rectifying circuit 1022 powered by the antenna 1024.

The antenna 1024 can be for example a dipole comprising two lengths of a conducting wire or rod 1025, one or more grids or one or more metal plates made of a metal or another suitable electrical conductor material.

The rectifying circuit 1022 can comprise for example a Schottky diode connected at the terminals of the antenna 1024 or another rectifying circuit, possibly a more complex rectifying circuit.

As shown for example in FIG. 5A, the rectenna 1020 can comprise a high frequency filter 1026 and/or a direct current filter 1028.

The high frequency filter 1026 is configured for cutting the frequencies of the currents generated by the antenna 1024 higher than a predetermined first frequency threshold, and for powering the rectifying circuit 1022.

The direct current filter 1028 can be configured for further smoothing the current or voltage produced by the rectifying circuit 1022.

The rectifying circuit 1022 powers the sensor 100, 100', 100", 100$^{III}$.

Each sensor 100, 100', 100", 100$^{III}$ is advantageously connected—for instance through a wired connection—also with a emitter and receiver unit 103, configured for transmitting the detections of the respective sensor 100, 100', 100", 100$^{III}$ to a logic unit 105.

The logic unit 105 can be for example a computer or another microprocessor device.

The logic unit 105 can be for example mounted on board of the vehicle mounting the track 1, and can communicate preferably wireless with the one or more emitter and receiver unit 103 mounted on the track 1.

In the alternative the logic unit can be remote from the vehicle mounting the track or tracks 1, and can be for example a remote server arranged several meters or kilometers away from the vehicle.

Preferably each emitter and receiver unit 103 is powered by a rectenna 1020, for example by the rectenna 1020 powering the sensor 100, 100', 100", 100$^{III}$ the emitter and receiver unit 103 communicates with.

One rectenna 1020, one or more sensors 100, 100', 100", 100$^{III}$ and one or more emitter and receiver unit 103 can form a small and compact sensor unit easy to be mounted in many parts of the crawler track 1.

The parts 1020, 100, 100', 100", 100$^{III}$ 103 can be connected one to another through wired or wireless connections.

The sensor 100, 100', 100", 100III can be or comprise for example a temperature sensor, a vibration or noise sensor, an ultrasonic sensor or a wear sensor configured for detecting the wear of a part of the crawler track, an accelerometer, a load cell or another pressure or force sensor, a sensor of particular substances or another chemical sensor, a receiver of a global positioning system such as the NAVSTAR-GPS developed by the USA, the GLONASS developed by the Russian federation, the GALILEO developed by the European Union or BEIDOU.

The vibration sensor can be—or comprise—for example an accelerometer, since the latter can be used for measuring or detecting vibrations.

The noise sensor can be or comprise for example a microphone.

The ultrasonic sensor can emit for example ultrasounds within the track-, shoe, plate or link material or within other material the wearing of which needs to be measured, and then detect their echoes which are affected by the shape and dimensions—and hence by the wear—of the part in which the ultrasounds travels and are reflected.

As shown in FIG. 6, 7, in a particular embodiment the sensor 100, 100', 100", 100$^{III}$ can be a wear sensor housed within the advancement rib 442 of a respective shoe 44.

As shown in FIG. 6, the wear sensor 100, 100', 100", 100$^{III}$ can be arranged at or near the base of the advancement rib 442, that is at or near the region at which the advancement rib 442 is fixed to the main plate 440, and can be configured for measuring the thickness THW1 of the material of the rib 442 interposed between the sensor 100, 100', 100", 100$^{III}$ itself and the outer environment in a direction parallel to the advancement rib 442 itself (FIG. 6), for example emitting electromagnetic or acoustic waves within the shoe material and detecting their echoes which are affected by the shape and dimensions of the rib 442.

In other words, the sensor 100 measures the wear of the advancement rib 442.

As shown in FIG. 7, the wear sensor 100' can extend over the whole height THW2 of the rib 442 and comprise a device for measuring the electric resistance, inductance or capacitance between the tip and the base of the rib 442.

To this purpose the wear sensor 100' can be provided with a resistive element 101 having for example the shape of a rod or plate, extending over the whole height THW2 of the rib 442 and having an electric resistance preferably different from that of the surrounding material—such as metal—of the rib 442.

To this end the resistive element 101 can be made of a material different from that of the rest of rib 442 or shoe 44.

Alternatively the resistive element 101 can be made of the same material as of the rest of rib 442 or shoe 44, of be made of a material having the same electrical resistance or resistivity as of the rest of rib 442 or shoe 44, and the resistive element 101 is electrically insulated from the rest of the rib 442 or shoe 44.

More particularly, the sides of the resistive element 101 can be electrically insulated from the rest of the rib 442 or shoe 44.

In any case the height THW2 can be measured for example measuring the electric resistance of the resistive element 101, since said resistance can be made proportional to or however depending on the height THW2.

As shown in FIG. 8, in a particular embodiment a plate 21 or more generally a track link 20 can be provided with one or more sensors 100 and/or 100' configured for measuring or however detecting a physical quantity of the track link 20 or of the environment surrounding it, such as wear of the upper face 212 of the plate 21.

The terms upper and lower referred to the plates and the track links are purely conventional in the present description and referred to when the shoe 44 is arranged below the considered track link 20 or plate 21, for example when the shoe 44 rests on the ground or a floor during normal operation of the track; however in other instants of operation the same track link can be turned upside down and have its upper face 212 below its lower face 210.

The upper face 212 can be subject to wear for example because it rolls and slightly slides against some wheels or rolls (not shown but per se known) of the undercarriage assembly of the vehicle.

Such wheels of rolls can be idle or driving wheels/rolls respectively.

As already explained about the shoe 44, the possible sensor 100 of the plate 21 can be configured for measuring or detecting wear by detecting echoes of an acoustic or electromagnetic waves emitted in the material of the plate 21, for example reflected by the upper surface 212.

As already explained about the shoe 44', the possible sensor 100' of the plate 21 can be configured for measuring or detecting wear by detecting resistance and changes thereof of a predetermined body, such as a resistive element 101 already described.

Mounting sensors 100 instead of sensors 100', 100" or vice versa can depend for example on the overall dimensions of the sensors themselves or on structural reasons.

As shown in FIG. 9, in a particular embodiment the track link 20' or more generally a crawler track can be provided with one or more temperature sensors 100", 100$^{III}$ configured for measuring or however detecting the temperature of the track link 20' itself.

More particularly, the temperature sensors 100", 100$^{III}$ can be configured for detecting the temperature at least of the lubricant present in the track link 20'.

To this purpose, if an annular or tubular chamber is present between the outer surface of a pin 31 and the inner surface of the respective bushing 32, and lubricating grease, oil or another lubricant fluid is present in such annular or tubular chamber, the temperature sensor 100$^{III}$ can be arranged on the inner surface of the bushing 32 and/or the temperature sensor 100" can be arranged on the outer surface of a pin 31 so that the sensors 100", 100$^{III}$ contact the lubricant, for example so as to be wetted or licked by it.

Advantageously the temperature sensor 100$^{III}$ are arranged so as to measure a temperature influenced by both the temperature of the metal—or other solid parts—of the track, shoe, link, pin or other part of an undercarriage or heavy duty vehicle and the temperature of the oil or another lubricant.

For example the temperature sensor 100", 100$^{III}$ can be arranged so as to be in contact with both the metal—or another solid part—of the heavy duty vehicle or part thereof and the lubricant.

To this purpose, the temperature sensor 100", 100$^{III}$ can be arranged in a recess 320 made in the bushing 32 or in a recess 310 made in the pin 31, and both the recesses 310, 320 and the temperature sensors 100", 100$^{III}$ can be licked by the oil, grease or another lubricant.

This way the temperature sensors 100", 100$^{III}$ will detect temperature values which will be a sort of—possibly weighted—mean value of the metal and the lubricant temperatures.

Analysing for example the evolution of the temperature detected over the time and other parameters, a suitable algorithm, for example run by the logic unit 105, can then identify particular conditions, such as the complete absence of lubricant or shortage thereof.

If the sensors 100", 100$^{III}$ detect an anomalous temperature, that is higher than a predetermined threshold, this can be considered quite a reliable indication of wear due to shortage of lubricant.

The information is quite reliable since the lubricant in a track are generally at ambient temperature.

Detecting shortage of lubricant provides important information per se about malfunctions of the track and of the whole vehicle.

Furthermore detecting shortage of lubricant does not provide a precise measure of the wear, but it is useful for identifying the occurrence of wear if combined with the detections of other kinds of sensors and/or with historical data of the particular track or more generally of the vehicle.

The temperature sensor 100$^{III}$ can be arranged in a shallow recess or another recess 320 made in the bushing 32, for example on the inner surface of the bushing 32.

The temperature sensor 100" can be arranged in a shallow recess or another recess 310 made in the pin 31, for example on the outer surface of the pin 31.

Alternatively the temperature sensors 100", 100$^{III}$ can be arranged in an internal lubrication duct 33 if present, so as to detect the temperature of the oil or other liquid lubricant.

The undercarriage assembly or the vehicle on which the crawler track 1 is mounted are advantageously provided with the abovementioned microwave source 104, that is with a suitable microwave generator.

Advantageously the microwave source 104 is mounted on, that is fixed to, a part of the vehicle 2 different from the crawler track 1.

In other words, the microwave source 104 is mounted on, that is fixed to, a part of the vehicle 2 outside of and/or separate from the crawler track 1.

To this end the microwave source 104 can be mounted on, that is fixed to, a part of the undercarriage assembly 4, 4', 4", 4''', 4$^{IV}$ different from the crawler track 1.

Still to this end the microwave source 104 can be mounted on, that is fixed to, said frame 6, 6', 6", 6''' which is part of the undercarriage assembly 4, 4', 4", 4''', 4$^{IV}$ and on which the track or tracks 1, 1' are mounted, that is said frame to which the track or tracks are fixed and relative to which can run (FIG. 13, 14).

As shown for example in FIGS. 13, 14, the microwave source 104 can be contained in said beams 8, 8' or more generally in said frame 6, 6', 6", 6'''.

The heavy duty vehicle 2 can comprise a monocoque or bodywork 10, 10' containing for example a compartment 12 for the vehicle driver and/or a main engine configured for propelling the whole vehicle 2, 2', 2" (FIG. 15, 16).

Said monocoque or bodywork 10, 10' can be supported by and/or mounted on and/or fixed to the undercarriage assembly 4, 4', 4", 4$^{IV}$.

More particularly said monocoque or bodywork 10, 10' can be supported by and/or mounted on and/or fixed to said frame 6, 6', 6", 6''' to which the track or tracks are fixed and relative to which can run.

As for example in the embodiment of FIG. 16, the heavy duty vehicle 2" can be provided with a slewing bearing 60 connecting the monocoque or bodywork 10' to the frame 6''' of the undercarriage assembly 4$^{IV}$ so as to allow the monocoque or bodywork 10' to rotate around a substantially vertical axis relative to the undercarriage assembly 4$^{IV}$.

The microwave source 104, that is said external electromagnetic source 104, can be contained in and/or mounted on, that is fixed to, said monocoque or bodywork 10, 10'.

Preferably the microwave source 104 is configured for powering one or more rectennas 1020 far away from the source 104 at least 0.5 meters, more preferably at least 1 meter, more preferably at least 2 meters, more preferably at least 4 meters, even more preferably at least 8 meters, even more preferably at least 12 meters.

Advantageously the undercarriage assembly or the vehicle on which the crawler track 1 is mounted are provided with one or more suitable waveguides configured for containing the microwaves produced by the onboard generator 104 or at least reducing their diffusion around the undercarriage assembly or vehicle, and directing the microwaves to one or more rectennas 1020.

Each microwave waveguide 110, 110', 110" can comprise for example a metallic duct, a tubular body (FIG. 17), a channel-like duct formed in metallic walls (FIG. 18, 19), one or more metallic plates or sheets; such plates or sheets can have a substantially planar shape or a single or double curvature shape.

Such ducts or tubular bodies can form microwave passages along which the microwaves emitted by the generator 104 propagate can have closed (FIG. 17) or open cross sections (FIG. 18, 19).

Each waveguide can comprise one or more upstream ends 112 and one or more downstream ends 114.

Each upstream end 112 is arranged at or near one or more microwave generators 104 and are configured for allowing propagation of the microwaves within the waveguide.

As for example in the embodiment of FIG. 19, the upstream end 112 can be a simple cut out or through opening in a plate, metal sheet or other wall of the microwave waveguide 110".

To this purpose each upstream end 112 is arranged at a distance DUS from the closest microwave generator 104 preferably equal to or smaller than three metres, preferably equal to or smaller than two metres, more preferably equal to or smaller than one metre, more preferably equal to or smaller than 0.5 metre, more preferably equal to or smaller than 0.1 metre, even more preferably equal to or smaller than 0.01 metres (FIG. 17).

As shown for example in FIG. 17, each microwave waveguide 110 can enclose one or more microwave generators 104.

Each downstream end is arranged at or near one or more rectennas 1020 and are configured for directing to that rectennas the microwaves coming from the generator 104.

To this purpose each downstream end 114 is arranged at a distance DDS from the closest rectenna 1020 preferably equal to or smaller than three metres, preferably equal to or smaller than two metres, more preferably equal to or smaller than one metre, more preferably equal to or smaller than 0.5 metre, more preferably equal to or smaller than 0.1 metre, even more preferably equal to or smaller than 0.01 metres (FIG. 19).

Such distance DDS between each downstream end 114 and the closest rectenna 1020 is considered when such rectenna reaches the closest point to the downstream end 114 along its path when the track 1, 1' moves.

Each microwave waveguide 110, 110', 110" can face, extend around and/or enclose at least part of a respective track 1, 1' (FIG. 18, 19).

Preferably at least a part of a microwave waveguide 110, 110', 110" is fixed to a part of the undercarriage assembly 4, 4', 4", 4"', $4^{IV}$ and/or of the heavy duty vehicle 2, 2', 2" different from the track or tracks 1, 1'.

Since they eliminate or significantly reduce the diffusion of the microwaves around the vehicle equipped with the track 1 and rectennas 1020, the waveguide or waveguides reduces harms to the persons near the vehicle, in particular to its driver and other staff.

An example of a possible way of operation and use of the track 1 and respective vehicle will now be described.

The waveguide contains and directs the microwaves generated by the microwave source 104 towards one or more rectennas 1020, powering the rectennas 1020 preferably even when the vehicle is travelling on one or more tracks 1.

Each rectenna 1020 powers one more respective sensor 100, 100', 100", $100^{III}$ and/or emitter and receiver units 103.

Hence the wear sensors 100, 100', the temperature sensors 100", $100^{III}$ or other sensors can be powered while the track is operating in a wireless way, with no electrical contacts between the track 1 and the rest of the undercarriage assembly or of the vehicle, and for example with no need of powering them with electric local batteries arranged close to the sensors themselves.

The relevant costs for replacing the local batteries can be thus saved.

The operation and advantages of rectennas 1020 and respective sensors 100, 100', 100", $100^{III}$ is analogous if the waveguide is absent.

A suitable onboard or remote computer or other logic unit 105 can receive—for example wireless—the detections of the sensors 100, 100', 100", $100^{III}$ via the emitter and receiver unit 103 and receive data or commands from the logic unit 105.

The logic unit 105 can manage an electronic database storing the detections of sensors 100, 100', 100", $100^{III}$ and other informations.

Depending on the detections of sensors 100, 100', 100", $100^{III}$ the logic unit can be programmed or otherwise configured for emitting alarm signals, for example for triggering visual or acoustic signals on a display or board which can be noticed by an operator, for example signalling anomalous wear conditions, an excessively worn advancement rib 442, an overheated pin 31 or bushing 32, lack of lubricant in a track link 20 or more generally in the crawler track 1.

An alarm signal can be emitted for example when a sensor 100, 100' detects an excessively small height THW1, THW2 respectively.

The logic unit 105 can communicate and exchange informations with the sensors 100, 100', 100", $100^{III}$ possibly in real time, that is with a delay preferably not greater than one month, more preferably not greater than two calendar weeks, more preferably not greater that one calendar week, and possibly not greater than 12 hours or 5 hours or one hour.

Alternatively the sensors 100, 100', 100", $100^{III}$ or their respective sensor units can store their detection in local memories and transmit them for example periodically to the logic unit 105.

Said local memories can have a capacity for example comprised between 10 byte-100 Gigabyte, between 50 bytes-1 Gigabyte or between 100 bytes-1 Megabyte.

The previous teachings allow powering sensors in positions of a vehicle, in which wired powering is difficult or impossible, like in the case of sensors arranged on a crawler track.

More particularly rectennas allow powering sensors even deeply enclosed within movable parts such as within the links and hinge pins of a track link, entailing very low maintenance and management costs: for example rectennas eliminate the costs of periodically replacing a great number of local batteries powering the sensors and arranged in the chain links, or eliminate the costs of sliding contacts along the power supply lines.

Rectennas allow a great number of sensors be easily set and powered on the same vehicle, with no significant growth of costs and complexity of the installation as the number of sensors increases: in fact such costs can be considered to grow about linearly or less than linearly with the increase of the sensor number.

The sensors can be duly protected and powered even if placed in a very harsh environment such that surrounding a crawler track, with abundant mud, grease, sand, stones and dirt in general, and with heavy mechanical and chemical stresses in general.

Such ease of installing and powering a great number of sensors allow a great number of physical quantities of a crawler track be constantly monitored, such as wear, temperature of critical parts or areas, shortage of lubricant, significantly reducing the running and maintenance costs of the tracks and consequently of the whole vehicle.

Monitoring these physical quantities in real time furthermore allows reducing the occurrence of critical situations and failures.

The embodiments previously described can be modified in several ways without departing from the scope of the present invention.

For instance the vehicle or track can be provided not only with wear or temperature sensors, but also with other kinds of sensors powered by one or more rectennas, for example accelerometers, load cells and other pressure- or force sensors, sensors for detecting specific substances, chemical sensors in general.

All constructional details can be replaced with technically equivalent elements.

A wording such as "A comprises B, C, D" or "A is made up of B, C, D" is to be understood as encompassing and disclosing the particular case of "A consists of B, C, D".

The wording "A comprises an element B" unless specified otherwise is to be understood as encompassing and disclosing the particular case of "A comprises one or more elements B".

The lists of possible modifications and variants are to be understood as non-exhaustive.

What is claimed is:

1. A heavy-duty vehicle comprising:
a crawler track on which a remainder of the heavy-duty vehicle is configured to roll so as to move;
a sensor;
a power supply unit configured to supply the sensor with electric power, wherein the power supply unit includes a rectenna configured to receive electromagnetic power from an external electromagnetic source and supply the sensor with at least part of the electromagnetic power; and
a shoe of the crawler track that is configured to be laid on a floor or a ground on which the crawler track can be moved forward, wherein the shoe comprises:
a main plate, and
an advancement rib protruding from the main plate, wherein the sensor is a wear sensor and includes a resistive element configured to detect wear of the advancement rib;
wherein the wear sensor extends over a whole height of the advancement rib from a tip of the advancement rib to a base of the advancement rib;
wherein the crawler track is equipped with a second sensor that is a wear sensor, a temperature sensor, a pressure sensor, a load cell, an accelerometer, a noise sensor, a vibration sensor, an ultrasound sensor, a receiver of a global positioning system, or a chemical sensor.

2. The heavy-duty vehicle of claim 1 wherein the crawler track comprises track links that are connected to form a chain extending along the crawler track, wherein the track links are configured to rest on the floor or the ground, wherein the second sensor is configured to detect wear of one of the track links or another part of the crawler track.

3. The heavy-duty vehicle of claim 1 wherein the crawler track comprises track links that are connected to form an articulated chain extending along the crawler track, wherein the track links are configured to rest on the floor or the ground, wherein the crawler track includes hinge pins that connect the track links to form the articulated chain, wherein the second sensor is a temperature sensor configured to measure a temperature of at least one of the hinge pins.

4. The heavy-duty vehicle of claim 3 wherein the temperature sensor is disposed in or on the at least one of the hinge pins.

5. The heavy-duty vehicle of claim 1 wherein the external electromagnetic source is configured to emit microwaves suitable for powering the rectenna, wherein the external electromagnetic source is fixed to a part of the heavy-duty vehicle other than the crawler track, and wherein the rectenna is fixed to the crawler track and is spaced at least 0.5 meters from the external electromagnetic source.

6. The heavy-duty vehicle of claim 5 comprising:
an undercarriage assembly that includes the crawler track; and
a monocoque or a bodywork containing a compartment for at least one of a driver of the heavy-duty vehicle or a main engine configured to propel the heavy-duty vehicle, wherein the monocoque or the bodywork is fixed to the undercarriage assembly,
wherein the external electromagnetic source is fixed to the monocoque or the bodywork.

7. The heavy-duty vehicle of claim 5, further comprising a waveguide configured to guide the microwaves, to reduce diffusion of the microwaves, and to direct the microwaves to the rectenna.

8. The heavy-duty vehicle of claim 1 wherein the second sensor is a pressure sensor.

9. The heavy-duty vehicle of claim 1 wherein the second sensor is a load cell.

10. The heavy-duty vehicle of claim 1 wherein the second sensor is an accelerometer.

11. The heavy-duty vehicle of claim 1 wherein the second sensor is a noise sensor.

12. The heavy-duty vehicle of claim 1 wherein the second sensor is a vibration sensor.

13. The heavy-duty vehicle of claim 1 wherein the second sensor is an ultrasound sensor.

14. The heavy-duty vehicle of claim 1 wherein the second sensor is a receiver of a global positioning system.

15. The heavy-duty vehicle of claim 1 wherein the second sensor is a chemical sensor.

16. The heavy-duty vehicle of claim 1 wherein the resistive element has an electric resistance different from an electric resistance of a material of the advancement rib.

17. The heavy-duty vehicle of claim 1 wherein the resistive element is electrically insulated from a material of the advancement rib.

18. An undercarriage assembly for a heavy-duty track-type vehicle, the undercarriage assembly comprising:
a crawler track on which a remainder of the heavy-duty vehicle is configured to roll so as to move;
a sensor;
an external electromagnetic source;
a power supply unit configured to supply the sensor with electric power, wherein the power supply unit includes a rectenna configured to receive electromagnetic power from the external electromagnetic source and supply the sensor with at least part of the electromagnetic power; and
a shoe of the crawler track that is configured to be laid on a floor or a ground on which the crawler track can be moved forward, wherein the shoe includes a main plate and an advancement rib protruding from the main plate, wherein the sensor is a wear sensor and includes a resistive element configured to detect wear of the advancement rib, wherein the wear sensor extends over a whole height of the advancement rib from a tip of the advancement rib to a base of the advancement rib;
wherein the external electromagnetic source is configured to emit microwaves suitable for powering the rectenna;
wherein the crawler track is equipped with a second sensor that is a wear sensor, a temperature sensor, a pressure sensor, a load cell, an accelerometer, a noise sensor, a vibration sensor, an ultrasound sensor, a receiver of a global positioning system, or a chemical sensor.

19. The undercarriage assembly of claim 18 wherein the external electromagnetic source is fixed to a part of the undercarriage assembly other than the crawler track, and wherein the external electromagnetic source is configured to power the rectenna, the rectenna being fixed to the crawler track and being spaced at least 0.5 meters away from the external electromagnetic source.

* * * * *